United States Patent
Son et al.

(10) Patent No.: US 10,184,677 B2
(45) Date of Patent: Jan. 22, 2019

(54) APPARATUS FOR BOTH HUMIDIFICATION AND AIR CLEANING

(71) Applicant: LG ELECTRONICS INC., Seoul (KR)

(72) Inventors: Sanghyuk Son, Seoul (KR); Jungwoo Lee, Seoul (KR); Jeongtaek Park, Seoul (KR); Jieun Choi, Seoul (KR); Chungook Chong, Seoul (KR); Taeyoon Kim, Seoul (KR); Kunyoung Lee, Seoul (KR); Jongsu Lee, Seoul (KR); Kyoungho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 134 days.

(21) Appl. No.: 15/338,283

(22) Filed: Oct. 28, 2016

(65) Prior Publication Data

US 2017/0122602 A1    May 4, 2017

Related U.S. Application Data

(60) Provisional application No. 62/248,463, filed on Oct. 30, 2015, provisional application No. 62/355,118, filed on Jun. 27, 2016.

(30) Foreign Application Priority Data

Nov. 7, 2015  (KR) .......................... 10-2015-0156254
Dec. 24, 2015 (KR) .......................... 10-2015-0185854
(Continued)

(51) Int. Cl.
*F24F 6/00* (2006.01)
*B01F 3/04* (2006.01)
(Continued)

(52) U.S. Cl.
CPC ................ *F24F 6/04* (2013.01); *B01D 46/10* (2013.01); *B01F 3/04099* (2013.01); *F24F 3/16* (2013.01);
(Continued)

(58) Field of Classification Search
CPC ....... F24F 6/00; F24F 6/12; B01F 3/04; B01F 3/04099
(Continued)

(56) References Cited

U.S. PATENT DOCUMENTS 1,994,912 A * 3/1935 Hochstetter ......... B01F 3/04035
                                                    261/91
3,806,102 A * 4/1974 Valenta ................. A61M 16/16
                                                    128/200.13
(Continued)

FOREIGN PATENT DOCUMENTS

CN       1535919 A      10/2004
JP       11-24759 A      1/1999
(Continued)

OTHER PUBLICATIONS

LG Electronics Inc.—LG Signature Catalog, "Model Name: AW141YAW", Mar. 17, 2016.

*Primary Examiner* — Robert A Hopkins
(74) *Attorney, Agent, or Firm* — Dentons US LLP

(57) ABSTRACT

A humidification and air cleaning apparatus including a water tank; a transparent body forming at least a portion of the water tank; a watering housing disposed in the water tank to spray water stored in the water tank; a nozzle disposed in the watering housing to spray the pumped water; an air wash inlet disposed in the water tank to receive external air into the water tank; and an air wash inlet disposed in the water tank to discharge internal air out of the water tank. During rotation, the sprayed water forms a certain trajectory and
(Continued)

collides with an inner side surface of the visual body. Air flowing outside the water tank forms an outer main stream before passing the air wash inlet. Air passing the air wash inlet forms an inner main stream inside the water tank, which passes the trajectory of sprayed water to the discharge port.

17 Claims, 35 Drawing Sheets

(30) Foreign Application Priority Data

| Dec. 24, 2015 | (KR) | 10-2015-0185876 |
|---|---|---|
| Mar. 28, 2016 | (KR) | 10-2016-0037235 |
| Jun. 30, 2016 | (KR) | 10-2016-0083066 |
| Oct. 6, 2016 | (KR) | 10-2016-0129321 |

(51) Int. Cl.

| *F24F 6/04* | (2006.01) |
|---|---|
| *F24F 6/12* | (2006.01) |
| *F24F 3/16* | (2006.01) |
| *F24F 6/16* | (2006.01) |
| *B01D 46/10* | (2006.01) |
| *F24F 13/20* | (2006.01) |
| *F24F 13/28* | (2006.01) |
| *F24F 6/14* | (2006.01) |

(52) U.S. Cl.
CPC ............ *F24F 6/12* (2013.01); *F24F 6/16* (2013.01); *F24F 13/20* (2013.01); *F24F 13/28* (2013.01); *B01D 2279/50* (2013.01); *F24F 2006/008* (2013.01); *F24F 2006/046* (2013.01); *F24F 2006/146* (2013.01)

(58) Field of Classification Search
USPC ................................. 261/72.1, 78.2
See application file for complete search history.

(56) References Cited

U.S. PATENT DOCUMENTS

| 5,213,595 A | 5/1993 | Kim |
|---|---|---|
| 2009/0208379 A1 | 8/2009 | Hou |
| 2015/0115481 A1 | 4/2015 | Jang et al. |

FOREIGN PATENT DOCUMENTS

| JP | 2008-082683 A | 4/2008 |
|---|---|---|
| JP | 2011-50533 A | 3/2011 |
| JP | 2011-242026 A | 12/2011 |
| JP | 2015-075285 A | 4/2015 |
| JP | 2015-143603 A | 8/2015 |
| KR | 10-2005-0024042 A | 3/2005 |
| KR | 10-1515153 B1 | 4/2015 |
| WO | 2013/141549 A1 | 9/2013 |
| WO | 2015/098984 A1 | 7/2015 |

* cited by examiner

1400 ity under 35 U.S.C. § 119 of U.S. Provisional Application
APPARATUS FOR BOTH HUMIDIFICATION AND AIR CLEANING

CROSS-REFERENCE TO RELATED APPLICATIONS

This U.S. non-provisional patent application claims priority under 35 U.S.C. § 119 of U.S. Provisional Application No. 62/248,463, filed on Oct. 30, 2015, Korean Patent Application No. 10-2015-0156254, filed on Nov. 7, 2015, Korean Patent Application No. 10-2015-0185854, filed on Dec. 24, 2015, Korean Patent Application No. 10-2015-0185876, filed on Dec. 24, 2015, Korean Patent Application No. 10-2016-0037235, filed on Mar. 28, 2016, U.S. Provisional Application No. 62/355,118, filed on Jun. 27, 2016, Korean Patent Application No. 10-2016-0083066, filed on Jun. 30, 2016, and Korean Patent Application No. 10-2016-0129321, filed on Oct. 6, 2016, the entire contents of which are hereby incorporated by reference.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter.

However, since a typical humidifier is used only in a low humidity season and an air cleaner has no humidification function, a user needs to purchase both products.

Also, since a typical humidifier has an air cleaning function as an additional function in addition to a humidification function as a main function, the air cleaning function is weak.

Furthermore, there is a limitation in that a typical humidifier or air cleaner cannot separately operate the humidification or air cleaning function.

SUMMARY OF THE INVENTION

The present invention provides a humidification and air cleaning apparatus which can separately operate a humidification function and an air cleaning function.

The present invention also provides a humidification and air cleaning apparatus which allows a user to check water drops formed on a humidification flow passage with his/her eyes and to intuitively know the humidification state.

The present invention also provides a humidification and air cleaning apparatus which can show rain views in various methods.

The present invention also provides a humidification and air cleaning apparatus which can show a rain view by scattering a portion of water supplied for watering.

The present invention also provides a humidification and air cleaning apparatus which can create a rain view by scattering once again a portion of sprayed water through a watering blade that rotates.

The present invention also provides a humidification and air cleaning apparatus which can generate negative ions in a process of creating a rain view.

The present invention also provides a humidification and air cleaning apparatus which can optimize an air flow when watering and rain view are performed in an air wash module.

The present invention also provides a humidification and air cleaning apparatus which can effectively implement watering, humidification, and water supply from the upper side.

The objectives of the present invention are not limited to the above-mentioned objectives, and other objectives that are not mentioned will be clearly understood by persons skilled in the art from the following description.

Embodiments of the present invention provide humidification and air cleaning apparatuses including: a water tank storing water; a visual body forming at least a portion of the water tank and formed of a transparent material; a watering housing disposed in the water tank to spray water stored in the water tank; a watering motor rotating the watering housing; a nozzle disposed in the watering housing and spraying the pumped water; an air wash inlet disposed in the water tank to receive external air into the water tank; and an air wash inlet disposed in the water tank and discharging internal air out of the water tank, wherein: when the watering housing rotates, water sprayed from the nozzle forms a certain trajectory and collides with an inner side surface of the visual body; air flowing outside the water tank forms an outer main stream before passing the air wash inlet; air passing the air wash inlet forms an inner main stream inside the water tank; and the inner main stream passes the trajectory of sprayed water to the discharge port.

In some embodiments, the inner main stream may be formed to cross the trajectory of sprayed water.

In some embodiments, the trajectory of water may be formed in a horizontal direction, and the inner main stream may be formed in a vertical direction.

In some embodiments, the outer main stream may be formed in a vertical direction.

In some embodiments, the outer main stream and the inner main stream may have the same flow direction as each other.

In some embodiments, the air wash inlet may form a connect stream connecting the outer main stream and the inner main stream, and the connect stream may form an included angle of 0 to about 90 degrees with the flow direction of the outer main stream.

In some embodiments, the humidification and air cleaning apparatus may further include a water tank humidification medium disposed inside the water tank and covering the air wash inlet, wherein: the water tank humidification medium is spaced from water stored in the water tank; water sprayed from the nozzle collides with the visual body and then flows down to wet the water tank humidification medium; and the connect stream is humidified while passing the water tank humidification medium.

In some embodiments, the trajectory of water may be located higher than the air wash inlet.

In some embodiments, the nozzle may be disposed at a location which is visible through the visual body.

In some embodiments, the visual body may be located higher than the air wash inlet.

In some embodiments, the discharge port may be disposed over the air wash inlet, and the main streams may flow from a lower side to an upper side and then may be discharged to the discharge port.

In some embodiments, the main streams may flow along the inner side surface of the visual body.

In some embodiments, when the watering housing rotates, water sprayed from the nozzle may form a spray line on the inner side surface of the visual body.

In some embodiments, the trajectory of water sprayed from the nozzle may be formed to direct from the inside to the outside of the water tank, and the flow direction of air passing the air wash inlet may be formed to direct from the outside to the inside of the water tank.

In some embodiments, the humidification and air cleaning apparatus may further include a top cover assembly disposed over the water tank, wherein the top cover assembly includes: a water supply flow passage providing water to the water tank; and a discharge flow passage discharging air flowing along the main streams, and the flow direction of water supplied through the water supply flow passage is opposite to the flow direction of the main stream.

In some embodiments, water supplied through the water supply flow passage may drops on the watering housing. When the watering housing rotates, the dropping water may form a certain trajectory and may collide with the inner side surface of the visual body. The main streams may pass the trajectory of the dropping water to the discharge port.

In some embodiments, the trajectory of dropping water may be located higher than the trajectory of sprayed water.

In some embodiments, the humidification and air cleaning apparatus may further include a watering blade disposed at an outer side of the watering housing, wherein when the watering housing rotates, at least one of the sprayed water and the dropping water collides with the watering blade to be scattered.

In some embodiments, the scattering water may form a trajectory that crosses the inner main stream.

In some embodiments, the humidification and air cleaning apparatus may further include a water tank humidification medium disposed inside the water tank and covering the air wash inlet, wherein the water tank humidification medium is spaced from water stored in the water tank, and water sprayed from the nozzle collides with the visual body and then flows down to wet the water tank humidification medium.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
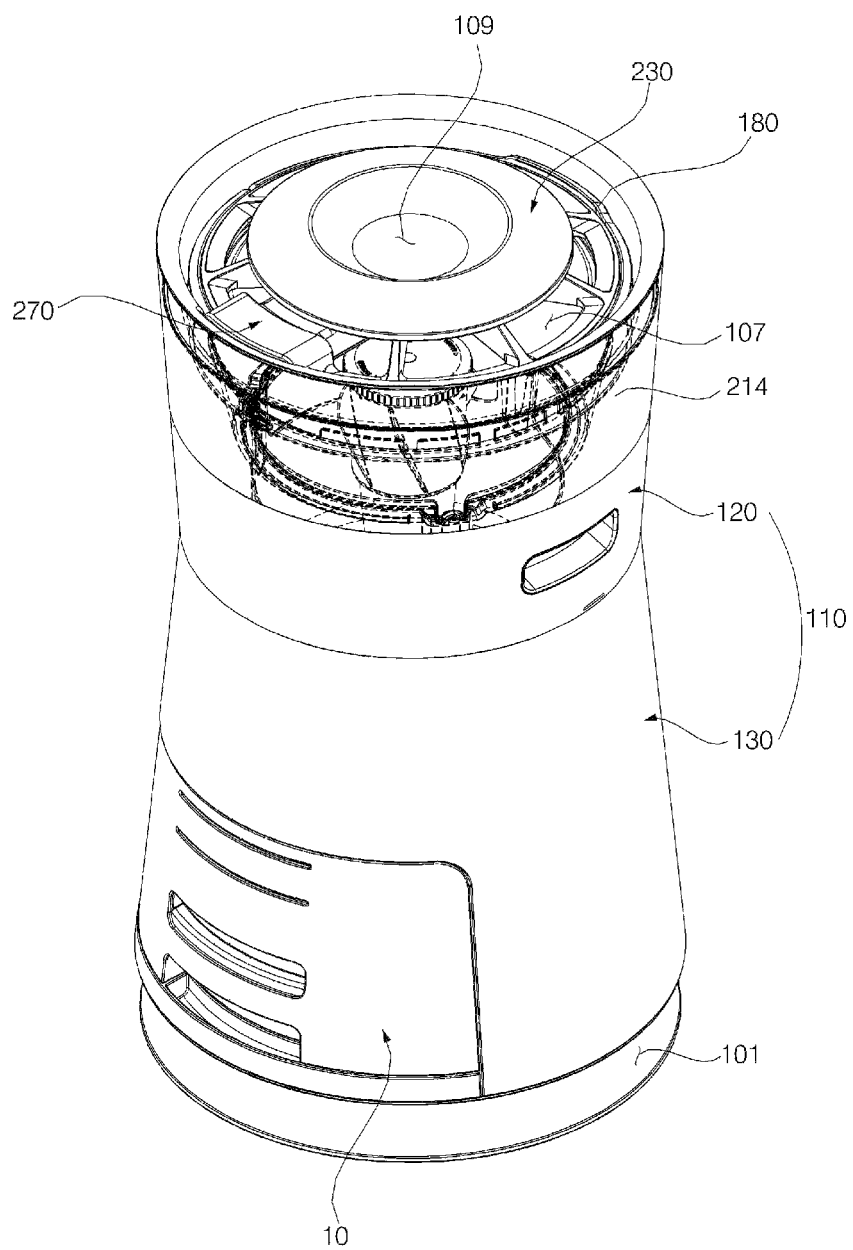
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Further, the present invention is only defined by scopes of claims. Like reference numerals refer to like elements throughout.

Hereinafter, exemplary embodiments of the present invention will be described in detail with reference to the accompanying drawings.

Figure 2:
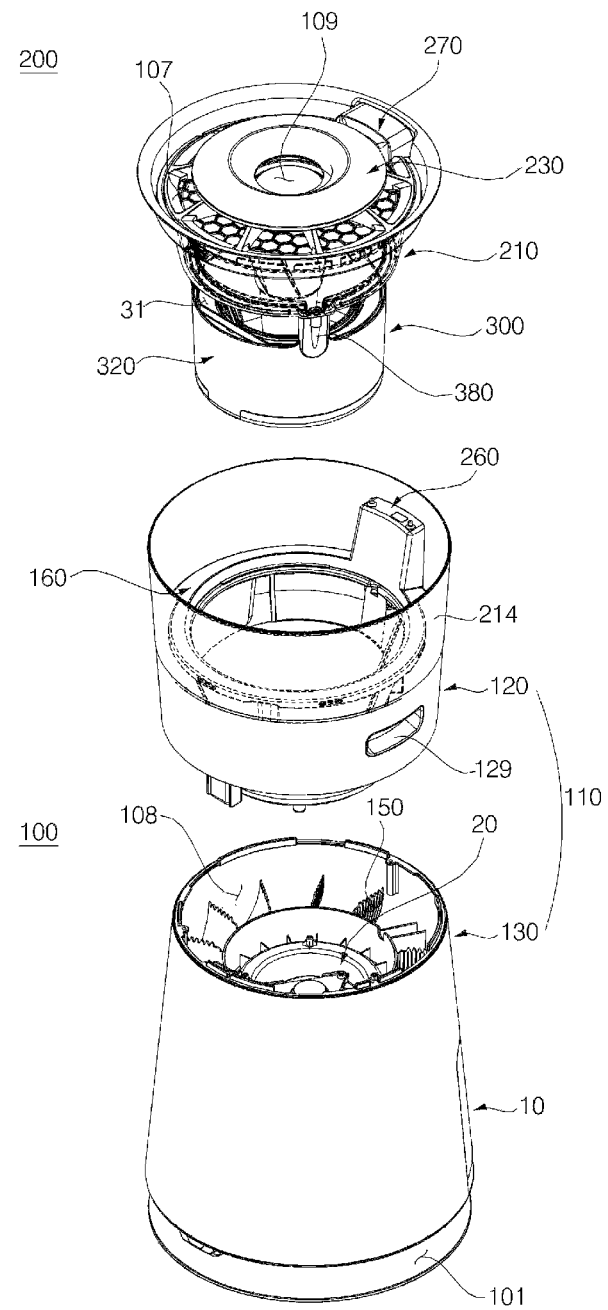
FIG. 2 is an exploded perspective view of FIG. 1.
Figure 3:
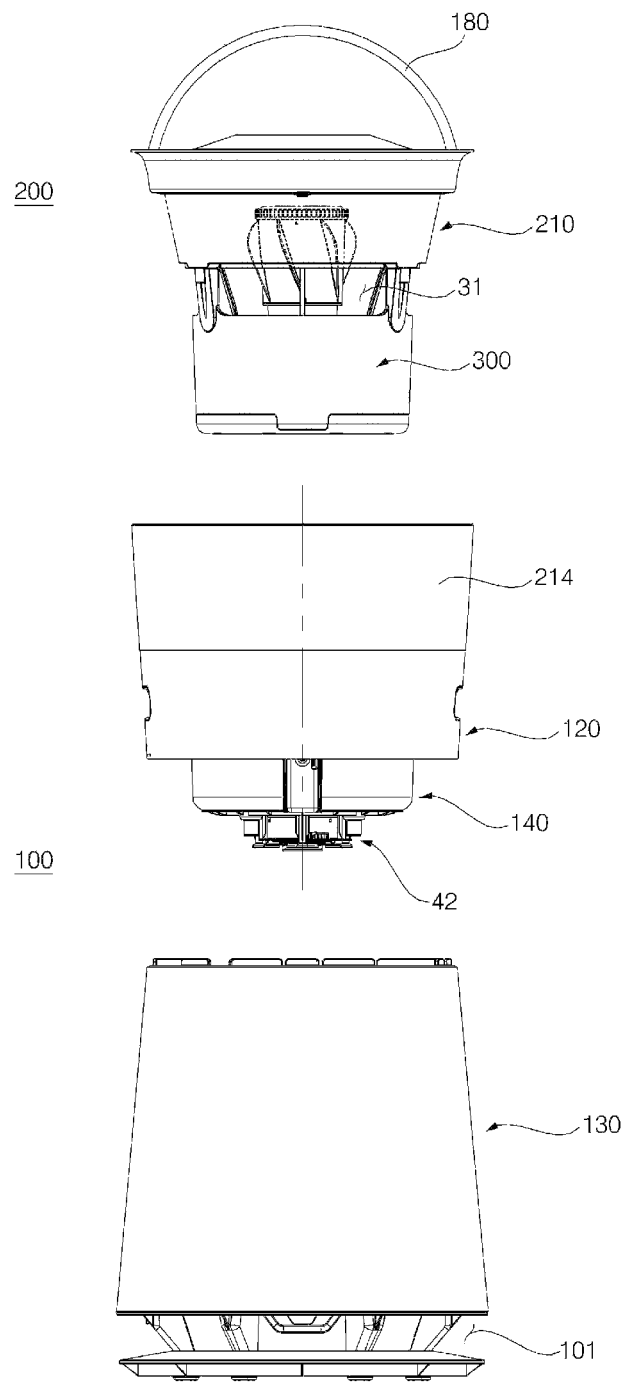
FIG. 3 is an exploded front view of FIG. 1.
Figure 4:
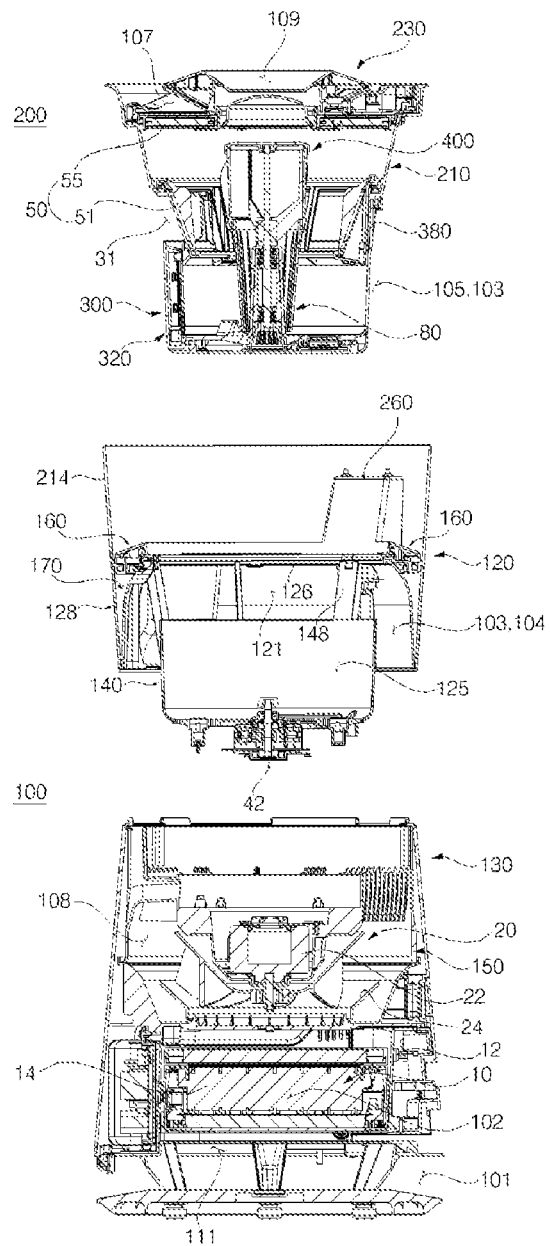
FIG. 4 is an exploded cross-sectional view of FIG. 3.
Figure 5:
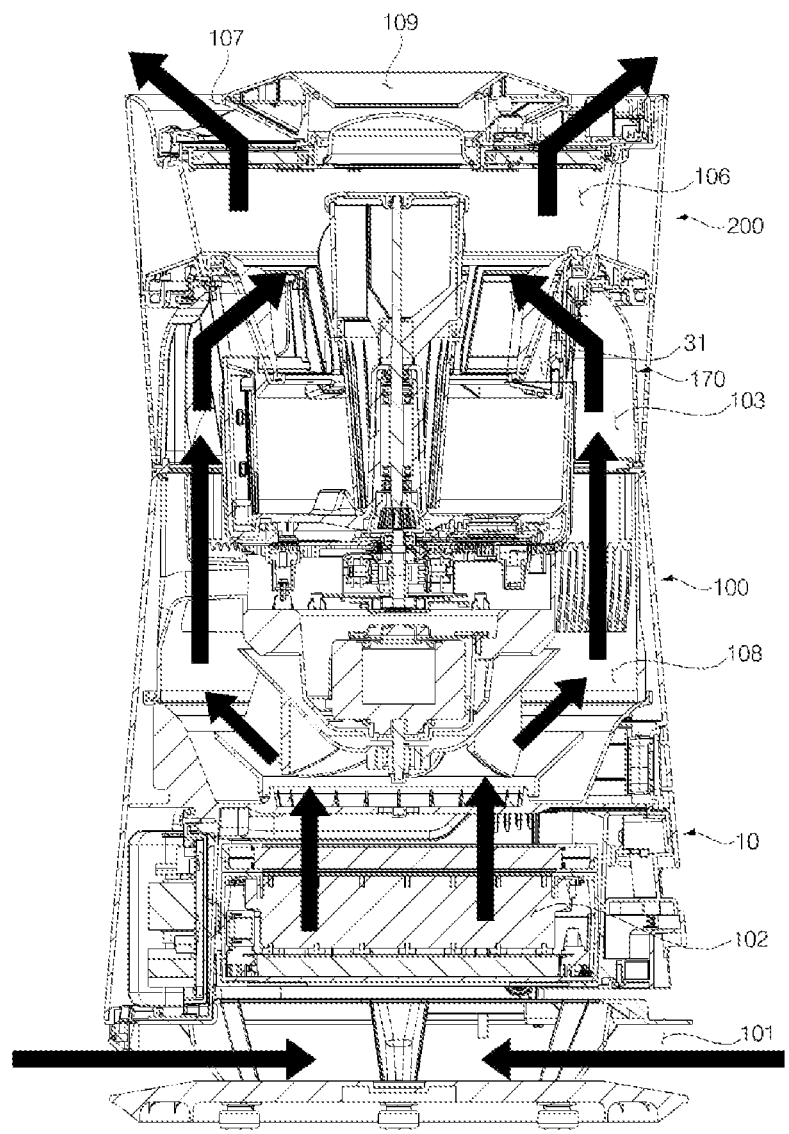
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a perspective view illustrating an air flow of the humidification and air cleaning apparatus according to the first embodiment of the present invention.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user.

The air clean module 100 may include a filter assembly 10 described later, and may be cleaned after the filter assembly 10 is separated from a base body 110.

A user may supply water into the air wash module 200. The air wash module 200 may have a water supply flow passage 109 formed therein to supply water from the outside to the water tank 300.

The water supply flow passage 109 may be configured to be separated from a discharge flow passage 107 from which air is discharged. The water supply flow passage 109 may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly disposed at the air clean module 100 and the air wash module 200. Only when the air wash module 200 is placed over the air clean module 100, the flow passage of the air wash module 200 and the flow passage of the air clean module 100 may communicate with each other through the connection flow passage 103.

The connection flow passage formed in the air clean module 100 may be defined as a clean connection flow passage 104, and the connection flow passage formed in the air wash module 200 may be defined as a humidification connection flow passage 105.

The flow of air passing through the air clean module 100 and the air wash module 200 will be described in more detail later.

Hereinafter, the air clean module 100 and the air wash module 200 will be described in more detail.

The air clean module 100 may include a base body 110, a filter assembly 10 that is disposed in the base body 110 and filters air, and an air blowing unit 20 that blows air.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The air clean module 100 may include an intake flow passage 101, a filtering flow passage 102, an air blowing flow passage 108, and a clean connection flow passage 104 disposed therein. Air entered through the intake flow passage 101 may flow to the clean connection flow passage 104 via the filtering flow passage 102 and the air blowing flow passage 108.

The air wash module 200 may include a humidification connection flow passage 105, a humidification flow passage 106, a discharge flow passage 107, and a water supply flow passage 109 disposed therein.

When the air wash module 200 is placed over the air clean module 100, the clean connection flow passage 104 of the air clean module 100 and the humidification connection flow passage 105 of the air wash module 200 may be connected to each other.

Filtered air supplied through the humidification connection flow passage 105 of the air wash module 200 may be discharged into the indoor via the humidification flow passage 106 and the discharge flow passage 107. The water supply flow passage 109 may be manufactured into a structure in which air is not discharged and only water is supplied while communicating with the humidification flow passage 106.

First, each configuration of the air clean module 100 will be described.

The base body 110 may include an upper body 120 and a lower body 130. The upper body 120 may be disposed on the lower body 130, and the upper body 120 and the lower body 130 may be assembled.

Air may flow into the base body 110.

The intake flow passage 101, the filtering flow passage 102, and the air blowing flow passage 108 may be disposed in the lower body 130, and structures that define the intake flow passage 101, the filtering flow passage 102, and the air blowing flow passage may be disposed in the lower body 130.

A portion of the connection flow passage 103 may be disposed in the upper body 120, and structures for guiding filtered air to the air wash module 200 and structures for supporting the air wash module 200 may be disposed in the upper body 120.

The base body 110 may include the lower body 130 defining the exterior thereof and having an inlet hole 110 formed in the undersurface thereof, and the upper body 120 defining the exterior thereof and coupled to the upper side of the lower body 130.

The filter assembly 10 may be detachably assembled in the base body 110.

The filter assembly 10 may provide the filtering flow passage 102, and may filter external air. The filter assembly 10 may have a structure that is detachable from the base body 110 in a horizontal direction. The filter assembly 10 may be disposed so as to cross the flowing direction of air that flows upstream in a vertical direction. The filter assembly 10 may slide in a horizontal direction, and may filter air that flows upward in a vertical direction. The filter assembly 10 may be disposed in a horizontal direction, and may form the filtering flow passage 102 in a vertical direction.

The filter assembly 10 may slide in a horizontal direction with respect to the base body 110.

The filter assembly 10 may include a filter housing 11 disposed in the lower body 130 and forming the filtering flow passage 102, and a filter 14 separably coupled to the filter housing 11 and filtering air passing the filtering flow passage 102.

The filter housing 12 may communicate with the intake flow passage 101 at the lower side thereof, and may communicate with the air blowing flow passage 108 at the upper side thereof. Air entered through the intake flow passage 101 may flow to the air blowing flow passage 108 via the filtering flow passage 102.

The filter housing 12 may be opened at one side thereof in a direction crossing the filtering flow passage 102. The filter 14 may detachably coupled through the opened surface of the filter housing 12. The opened surface of the filter housing 12 may be formed in a lateral direction. The opened surface of the filter housing 12 may be disposed on the outer surface of the lower body 130. Accordingly, the filter 14 may be inserted through the side surface of the lower body 130, and may be located inside the filter housing 12. The filter 14 may be disposed to cross the filtering flow passage 102, and may filter air passing the filtering flow passage 102.

The filter 14 may be an electric duct collecting filter that collects foreign substances in the air by electrifying the filter using applied power. The filter 14 may be formed of a material that collects foreign substances in the air through a filter medium. The filter 14 may be disposed in various structures. The scope of the inventive invention is not limited to the filtering method or the filter medium of the filter 14.

The filtering flow passage 102 may be disposed in the same direction as the main flowing direction of the humidification and air cleaning apparatus. In this embodiment, the filtering flow passage 102 may be disposed in a vertical direction, and may allow air to flow in the opposite direction to gravity. That is, the main flowing direction of the humidification and air cleaning apparatus may be formed so as to direct from bottom to top.

The air blowing unit 20 may be disposed over the filter housing 12.

The upper side surface of the filter housing 12 may be opened, and air passing the filtering flow passage 102 may flow to the air blowing unit 20.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side. The motor shaft of the blower motor 22 may direct to bottom, and may be coupled to the blower fan 24.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower housing 150 may form the air blowing flow passage 108 therein. The blower fan 24 may be disposed in the air blowing flow passage 108. The air blowing flow passage 108 may connect the filtering flow passage 102 and the clean connection flow passage 104.

The blower fan 24 may be a centrifugal fan, and may blow air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may be installed so as to be covered by the blower fan 24. The blower motor 22 may not be located on the airflow passage by the blower fan 24, and may not generate a resistance against air flowing by the blower fan 24.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, and an air guide 170 coupling the upper inner body 140 and the upper outer body 128 and guiding air to the water tank 300.

Since the upper body 120 is disposed to separate the connection flow passage and the water tank insertion space, water of the water tank 300 flowing into the connection flow passage can be minimized. Particularly, since the connection flow passage is divided by the upper inner body 140 and disposed outside a space in which water is stored, water can be inhibited from flowing into the connection flow passage.

The upper inner body 140 may be formed to be opened at the upper side thereof, and may receive the water tank 300. The upper inner body 140 may form a portion of the clean connection flow passage 104 into which filtered air flows.

The upper inner body 140 may have an upper inlet 121 formed therein and corresponding to an air wash inlet 31. The upper inlet 121 may not be an essential component. It may be sufficient if the upper body 120 has a shape that exposes the air wash inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

The air guide 170 may cover the outside of the upper inner body 140 360 degrees of a circumference of the upper inner body 140. The air guide 170 may guide air to the water tank 300 in all directions of 360 degrees of a circumference of the water tank 300. The air guide 170 may inwardly collect air guided along the outside of the lower body 130, and may supply the collected air to the water tank 300. Through this structure, the flow rate of air supplied to the water tank 300 can be sufficiently secured.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by allowing a connection angle of the connection flow passage 103 and the filtering flow passage 102 to be similar to the straightly traveling direction.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the air wash inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a water tank body extension part 380. When the water tank 300 is placed, the water tank body extension part 380 may be located inside the inner body extension part 148. The inner body extension part 148 and the water tank body extension part 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may be disposed outside the upper inlet 121, and the water tank insertion space 125 may be disposed inside the upper inlet 121. Air flowing along the clean connection flow passage 104 may pass through the upper inlet 121. When the water tank 300 is placed in the water tank insertion space 125, filtered air passing through the upper inlet 121 may flow into the water tank 300.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200. Unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display 160 may have a ring shape. Unlike this embodiment, the display 160 may be formed into an arc shape. The surface of the display 160 may be formed of a material that can reflect light, or may be coated with a material that can reflect light.

Accordingly, when water drops are formed on the visual body 210, water drops formed on the visual body 210 may be projected onto or reflected by the surface of the display 160. When the water drops formed on visual body 210 flows down, the same effect is also shown on the display 160.

This effect may give a visual stimulus to a user, and a user may intuitively recognize that humidification is being performed. The water drop image projected on the display 160 may give a refreshment feeling to a user, and may allow a user to know the humidification state.

The upper side surface of the display 160 may be obliquely formed. The display 160 may be obliquely disposed toward a user. Accordingly, the inside of the display 160 may be high, and the outside thereof may be low.

Hereinafter, each configuration of the air wash module 200 will be described.

The air wash module 200 may increase humidity in the filtered air. The air wash module 200 may implement a rain view in the humidification flow passage 106. The air wash module 200 may spray and circulate water in the water tank 300. The air wash module 200 may change water into small-sized droplets, and may again wash filtered air through scattered droplets. When filtered air is washed through scattered droplets, humidification and filtering may be performed once again.

The air wash module 200 may include the humidification connection flow passage 105, the humidification flow passage 106, the discharge flow passage 107, and the water supply flow passage 109.

The air wash module 200 may include the water tank 300, the watering unit 400, the humidification medium 50, the visual body 210, the top cover assembly 230, and a handle 180.

The handle 180 may be coupled to the visual body 210, may rotate in the visual body 210, and may be held in the visual body 210. A user may simply lift up only the air wash module 200 through, and may separate the air wash module 200 from the air clean module 100.

The humidification connection flow passage 105 may be disposed outside the water tank 300, and may guide air into the water tank 300. The humidification connection flow passage 105 may be disposed outside the visual body 210, and may guide air into the visual body 210.

The humidification connection flow passage 105 may be disposed at the outside of at least one of the water tank 300 and the visual body 210, and may guide air into one of the water tank 300 and the visual body 210.

The discharge flow passage 107 may be disposed between the top cover assembly 230 and the visual body 210. The discharge flow passage 107 may be disposed in at least one of the top cover assembly 230 and the visual body 210.

In this embodiment, the discharge flow passage 107 may be disposed at the outer edge of the top cover assembly 230, and the water supply flow passage 109 may be disposed at the center of the inside of the top cover assembly 230.

In the humidification and air cleaning apparatus according to this embodiment, a power source may be connected to the air clean module 100, and the air wash module 200 may be supplied with power through the air clean module 100.

Since the air wash module 200 has a structure separable from the air clean module 100, the air clean module 100 and the air wash module 200 may be provided with a separable power supply structure.

Since the air clean module 100 and the air wash module 200 are separably assembled through the upper body 120, a connector 260 may be disposed in the upper body 120 to provide power for the air wash module 200.

The top cover assembly 230 of the air wash module 200 may be provided with a control part and a display which requires power. A top connector 270 may be disposed in the air wash module 200, and may be separably connected to the connector 260. The top connector 270 may be disposed in the top cover assembly 230.

In this embodiment, since the top cover assembly 230 is separable, the inner side surface of the visual body 210 or the inner side surface of the water tank 300 can be conveniently cleaned.

The top cover assembly 230 may include the water supply flow passage 109 formed therein, and may form the discharge flow passage 107 with the visual body 210 in between. The top cover assembly 230 may be installed separately from the visual body 210. The top cover assembly 230 may include the top connector 270 disposed therein and electrically connected to the connector 260.

When the top cover assembly 230 is placed, the top connector 270 may be disposed over the connector 260. The top cover assembly 230 may be supplied with electricity from the connector 260 via the top connector 270.

A water level display part (not shown) may be disposed around the water supply flow passage 109 to display the water level of the water tank 300. Thus, a user can check the water level of the water tank 300 when supplying water. By disposing the water level display part on the movement line of water supply, a user can be prevented from excessively supplying water, and the water tank 300 can be prevented from overflowing.

The water level display part may be disposed in the top cover assembly 230. The separable power supply structure of the top connector 270 and the connector 260 may achieve effective upper water supply.

The water tank 300 may be separably placed in the upper body 120. The watering unit 400 may be disposed inside the water tank 300, and may rotate inside the water tank 300.

The water tank 300 may include a water tank body 320 storing water, an air wash inlet 31 formed at the side surface of the water tank body 320, and a water tank body extension part 380 upwardly extending from the water tank body 320 and coupled to the visual body 210.

In this embodiment, the water tank body 320 may be formed into a cylindrical shape with an opened upper side. Unlike this embodiment, the water tank body 320 may be formed into various shapes.

The water tank body extension part 380 may upwardly extend from the water tank 300. The water tank body extension part 380 may form the air wash inlet 31. The air wash inlet 31 may be formed between the water tank body extension part 380.

The air wash inlet 31 may be formed in the side surface of the water tank body 320. The air wash inlet 31 may be formed on the water tank body 320 in all directions of 360 degrees of a circumference of the water tank body 320. The air wash inlet 31 may communicate with the humidification connection flow passage 105.

The water tank body extension part 380 may guide water flowing down from the inner side surface of the visual body 210 into the water tank 300. The noise of dropping water can be minimized by guiding water flowing down from the visual body 210.

The water tank body extension part 380 may be coupled to the lower end of the visual body 210.

In this embodiment, the air wash inlet 31 may be formed by the configuration of the water tank body 320. Unlike this embodiment, the air wash inlet 31 may also be formed by disposing the water tank body extension part 380 in the visual body 210. Also unlike this embodiment, a portion of a plurality of water tank body extension parts 380 may be disposed in the water tank 300, and other water tank body extension parts 380 may be disposed in the visual body 210 to configure the air wash inlet 31. Unlike this embodiment, the air wash inlet 31 may also be formed in a separate configuration distinguished from the visual body 210 and the water tank 300. Unlike this embodiment, the air wash inlet 31 may also be formed by forming an opened surface in the visual body 210 and by forming an opened surface in the water tank 300.

That is, the air wash inlet 31 may be disposed in at least one of the water tank 300 and the visual body 210. The air wash inlet 31 may be formed by combining the water tank 300 and the visual body 210. The air wash inlet 31 may be disposed in a separate configuration distinguished from the water tank 300 and the visual body 210, and then the separate configuration may be disposed between the water tank 300 and the visual body 210. The air wash inlet 31 may be formed by combination of the water tank 300 and the visual body 210.

The air wash inlet 31 may be disposed at the side of the air wash module 200, and may be connected to the humidification flow passage 106. The air wash inlet 31 may communicate or connect with the humidification connection flow passage 105.

The watering unit 400 may have a function of supplying water to the humidification medium 50. The watering unit 400 may have a function of visualizing the humidification process. The watering unit 400 may have a function of implementing a rain view inside the air wash module 200.

The watering unit 400 may draw water inside the water tank 300 by rotating a watering housing 800, may upwardly pump drawn water, and then may spray pumped water toward the outside in a radial direction. The watering unit 400 may include the watering housing 800 that draws water, upwardly pumps drawn water, and then sprays pumped water toward the outside in a radiation direction.

In this embodiment, the watering housing 800 may be rotated in order to spray water. Unlike this embodiment, water may also be sprayed using a nozzle instead of the watering housing. Water may be supplied to the humidification medium 50 by spraying water from the nozzle, and the rain view may be similarly implemented. According to embodiments, water may be sprayed from the nozzle, and the nozzle may be rotated.

Water sprayed from the watering housing 800 may wet the humidification medium 50. Water sprayed from the watering housing 800 may be sprayed toward at least one of the visual body 210 and the humidification medium 50.

Water sprayed toward the visual body 210 may implement a rain view. Water sprayed toward the humidification medium 50 may be used to humidify filtered air. The rain view may be implemented by spraying water toward the visual body 210, and then water flowing down from the visual body 210 may be used to wet the humidification medium 50.

In this embodiment, a plurality of nozzles having different heights may be disposed on the watering housing 800. Water discharged out of any one nozzle may form droplets on the inner side surface of the visual body 210 to implement a rain view, and water discharged out of another nozzle may wet the humidification medium 50 to be used for humidification.

The watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

Particularly, water flowing down from the visual body 210 may wet the humidification medium 50 to be used for humidification. The humidification medium 50 may be wetted with water sprayed from the watering housing 800 and water flowing down from the visual body 210.

The visual body 210 may be coupled to the water tank 300, and may be located over the water tank 300. At least a portion of visual body 210 may be formed of a material through which a user can see the inside.

A display module 160 may be disposed outside the visual body 210. The display module 160 may be coupled to any one of the visual body 210 and the upper body 120.

The display module 160 may be disposed on a location where a user can observe a rain view. In this embodiment, the display module 160 may be disposed at the upper body 120.

When the air wash module 200 is placed, the outer surface of the visual body 210 may adhere closely to the display module 160. At least a portion of the surface of the display module 160 may be formed of or coated with a material that reflects light.

Droplets formed on the visual body 210 may also be projected onto the surface of the display module 160. Accordingly, a user can observe the motion of droplets at both visual body 210 and display module 160.

The water tank 300 may include the air wash inlet 31 which is formed thereon and through which air passes. The air wash inlet 31 may be located between the connection flow passage 103 and the humidification flow passage 106. The air wash inlet 31 may be an outlet of the connection flow passage 103, and may be an inlet of the humidification flow passage 106.

Filtered air supplied from the air clean module 100 may flow into the air wash module 200 through the air wash inlet 31.

The humidification medium 50 may include a water tank humidification medium 51 disposed at the inlet of the humidification flow passage 106, and a discharge humidification medium 55 disposed at the outlet of the humidification flow passage 106. The outlet of the humidification flow passage 106 and the inlet of the discharge flow passage 107 may be connected to each other. Accordingly, the discharge humidification medium 55 may be disposed at the discharge flow passage 107.

Since the connection flow passage 103, the humidification flow passage 106, and the discharge flow passage 107 are not formed of structures such as duct, it may be difficult to clearly distinguish the boundaries thereof. However, the humidification flow passage 106 in which humidification is performed is defined as between the water tank humidification medium 51 and the discharge humidification medium 55, the connection flow passage 103 and the discharge flow passage 107 may be naturally defined.

The connection flow passage 103 may be defined as between the blower housing 150 and the water tank humidification medium 51. The discharge flow passage 107 may be defined as after the discharge humidification medium 55.

In this embodiment, the water tank humidification medium 51 may be disposed at the air wash inlet 31 of the water tank 300.

The water tank humidification medium 51 may be located at at least one of the same plane, the outside, and the inside of the air wash inlet 31. Since the water tank humidification medium 51 is wetted with water for humidification, it may be desirable that the water tank humidification medium 51 is located at the inside of the air wash inlet 31.

Water flowing down after wetting the water tank humidification medium 51 may be stored in the water tank 300. Water flowing down after wetting the water tank humidification medium 51 may be configured so as not to flow out of the water tank 300.

Thus, the water tank humidification medium 51 may humidify filtered air passing through the air wash inlet 31.

Water that is naturally evaporated from humidification medium 50 may humidify filtered air. The natural evaporation means that water evaporates in a state where separated heat is not applied to water. As contact with air increases, as the flow velocity of air increases, as the pressure in the air decreases, the natural evaporation may be promoted. The natural evaporation may also be referred to as natural vaporization.

The humidification medium 50 may promote the natural evaporation of water. In this embodiment, the humidification medium 50 may be wetted with water, but may not be immersed in the water tank 300.

Since disposed separately from water stored in the water tank 300, the water tank humidification medium 51 and the discharge humidification medium 55 may not be always wet even though there is water stored in the water tank 300. That is, the water tank humidification medium 51 and the discharge humidification medium 55 may become wet only during the operation of humidification mode, and the water tank humidification medium 51 and the discharge humidification medium 55 may be maintained at a dry state during the operation of air cleaning mode.

The water tank humidification medium 51 may cover the air wash inlet 31, and air may penetrate the water tank humidification medium 51 to flow into the water tank 300.

The discharge humidification medium 55 may be disposed at the outlet of the humidification flow passage 106 or at the inlet of the discharge flow passage 107.

In this embodiment, the discharge humidification medium 55 may be disposed so as to cover the upper part of the visual body 210. The discharge humidification medium 55 may be placed on the visual body 210. Unlike this embodiment, the discharge humidification medium 55 may be coupled to the undersurface of the top cover assembly 230.

The discharge humidification medium 55 may cover the discharge flow passage 107, and humidified air may penetrate the discharge humidification medium 55 and then flow to the discharge flow passage 107.

Figure 6:
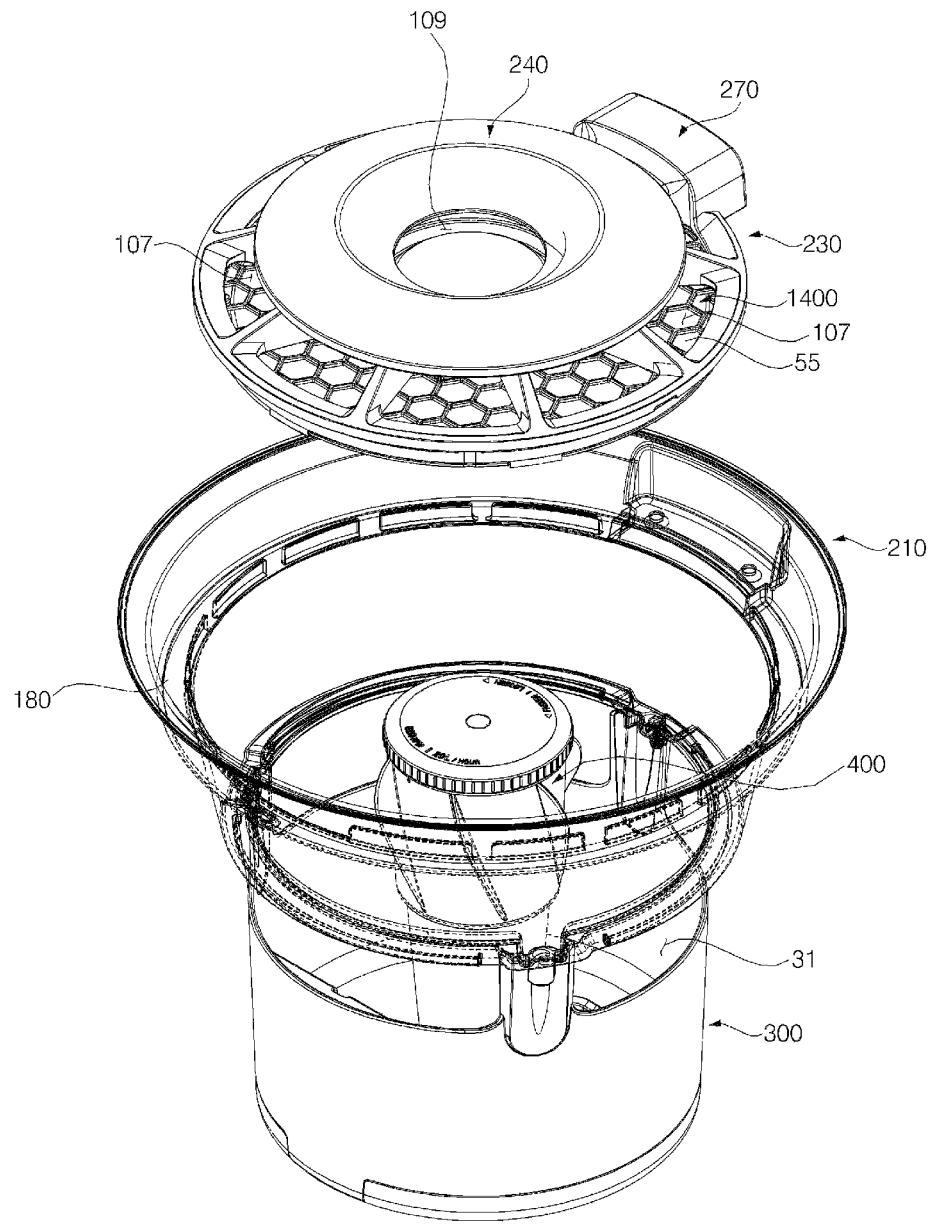
FIG. 6 is a perspective view illustrating a top cover assembly separated from the air wash module shown in FIG. 2.
Figure 7:
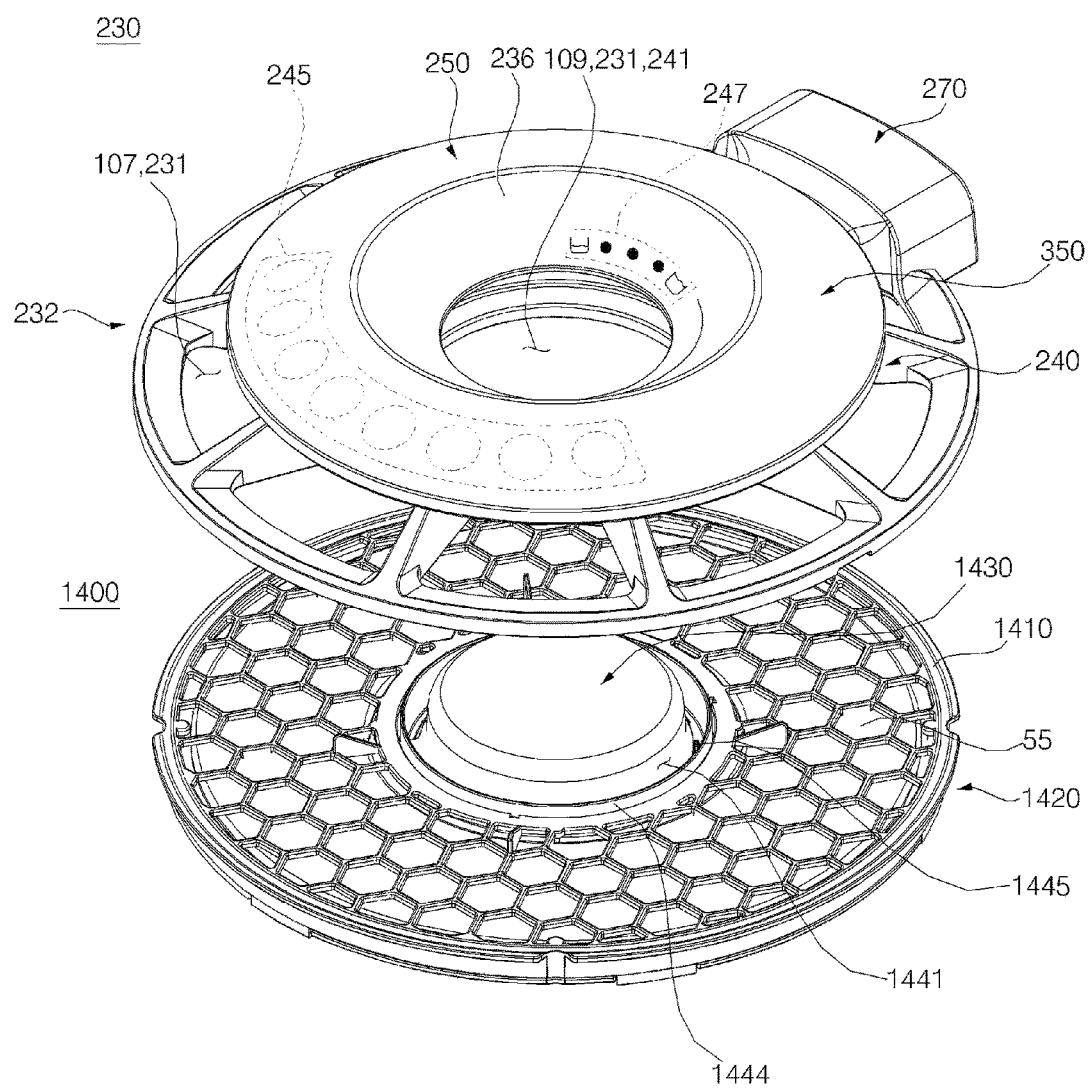
FIG. 7 is a perspective view illustrating the top cover assembly separated from the discharge humidification medium housing shown in FIG. 6.

FIG. 6 is a perspective view illustrating a top cover assembly separated from the air wash module shown in FIG. 2. FIG. 7 is a perspective view illustrating the top cover assembly separated from the discharge humidification medium housing shown in FIG. 6.

In this embodiment, the top cover assembly 230 may be separably placed on the visual body 210. The top cover assembly 230 may provide the water supply flow passage 109 for water supply, as well as the discharge flow passage 107.

In this embodiment, the top cover assembly 230 may be located over the discharge humidification medium 55. In this embodiment, a discharge humidification medium housing 1400 in which the discharge humidification medium 55 is disposed may be disposed, and the top cover assembly 230 may be disposed over the discharge humidification medium housing 1400. The discharge humidification medium housing 1400 may be placed over the visual body 210. The top cover assembly 230 may be placed over the discharge humidification medium housing 1400. The top cover assembly 230 may be integrally assembled with the discharge humidification medium housing 1400. In this embodiment, the top cover assembly 230 and the discharge humidification medium housing 1400 may be independently manufactured.

The top cover assembly 230 may be placed on and supported by the visual body 210, and may not apply a load to the discharge humidification medium housing 1400.

The discharge humidification medium housing 1400 may include the discharge humidification medium 55 disposed therein, and may cover the upper part of the visual body 210. The water supply flow passage 109 may be configured to pass the discharge humidification medium housing 1400. The discharge flow passage 107 may be configured to pass the discharge humidification medium housing 1400.

The top cover assembly 230 may include a top cover grille 232 forming the discharge flow passage 107 and the water supply flow passage 109, a control module 240 installed at the top cover grille 232, and a top connector 270 providing power or signals to the control module 240.

The top cover grille 232 may include a grille discharge port 231 forming at least a portion of the discharge flow passage 107, and a grille water supply port 233 forming at least a portion of the water supply flow passage 109. The grille discharge port 231 and the grille water supply port 233 may be opened in a vertical direction. The grille water supply port 233 may be disposed at the center of the inside of the top cover grille 232, and the grille discharge port 231 may be disposed outside the grille water supply port 232.

The top cover grille 232 may be separably placed on the visual body 210. The top cover grille 232 may be placed inside the visual body 210.

The control module 240 may be coupled to the top cover grille 232. The control module 240 may receive control signals from a user. The control module 240 may deliver the water level information to a user. The water supply flow passage 109 may be disposed in the control module 240. The control module 240 may electrically connected to the top connector 270, and may be provided with power from the top connector 270.

The operation module 240 may include an operation housing 250 coupled to the top cover grille 232 and including at least a portion of the water supply flow passage 109 formed therein, an input unit 245 disposed on the operation housing 250, a water level display unit 247 disposed on the operation housing 250, and an operation controller (not shown) for controlling the input unit 245 and the water level display unit 247.

The operation housing 250 may include an upper operation housing 242 and a lower operation housing 244.

The water supply flow passage 109 may be formed in the control module 240. A portion of the water supply flow passage 109 may be formed at the center of the operation module 240 in a vertical direction. An operation water inlet 241 forming at least a portion of the water supply flow passage 109 may be formed in the operation module 240. The operation water inlet 241 may be disposed inside the operation housing 250, and may be opened in a vertical direction.

The operation module 240 may further include an upper water supply guide 236. The upper water supply guide 236 may guide water supplied from the upper side into the operation water inlet 241. The upper water supply guide 236 may be formed by obliquely forming a partial surface of the operation housing 250.

Upon water supply from the upper side, a user cannot see the water level inside the water tank 300, but can immediately check an elevated water level through the water level display unit 247 disposed around the operation water inlet 241. Since a user can check the water level through the water level display unit 247 during the water supply from the upper side, the flow rate of water supply from the upper side can be controlled.

Water supplied from the upper side may pass the discharge humidification medium housing 1400, and may drop into the humidification flow passage 106. Particularly, water supplied from the upper side may not directly drop on the water surface, and may drop on the upper part of the watering housing 800.

When the watering housing 800 is rotating during the water supply from the upper side, water supplied from the upper side may scatter at the upper part of the watering housing 800 and thus form a separate rain view.

That is, a rain view may be formed by water sprayed from the watering unit 400, and a rain view may also be implemented by water supplied from the upper side.

Figure 8:
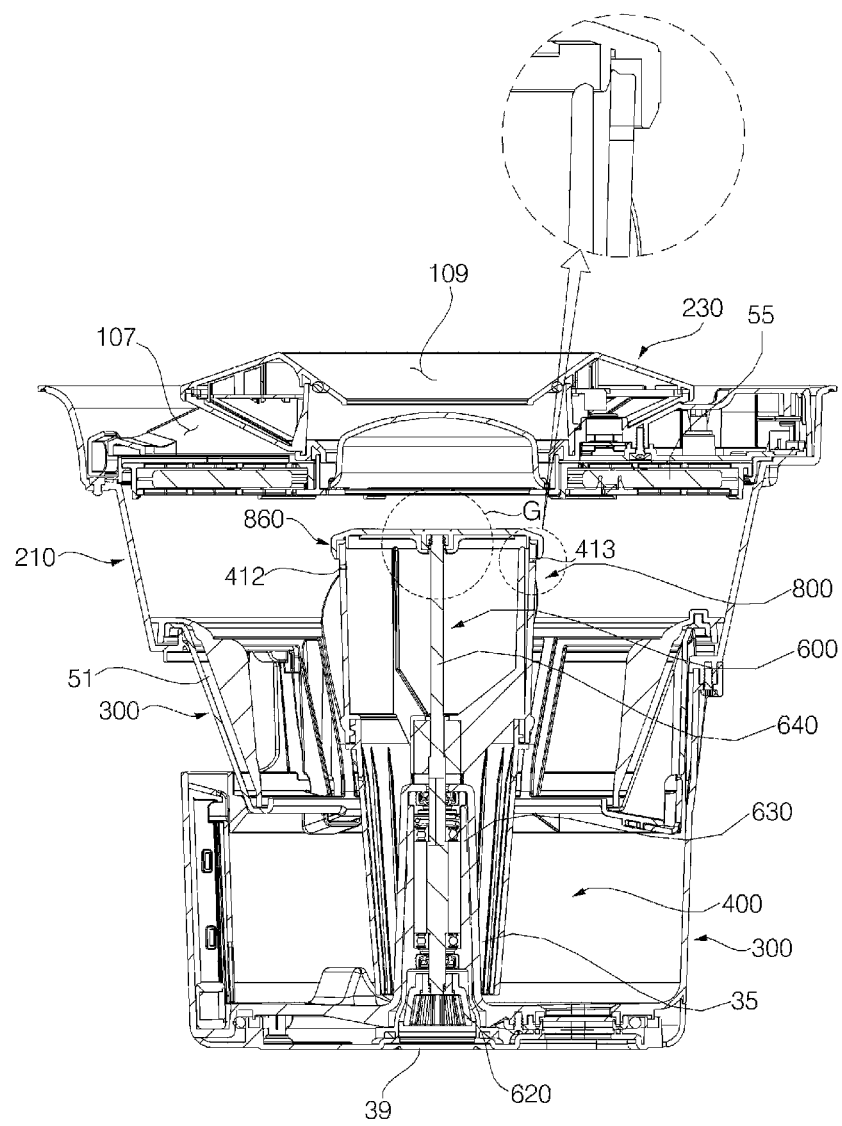
FIG. 8 is a cross-sectional view illustrating the air wash module shown in FIG. 4.
Figure 9:
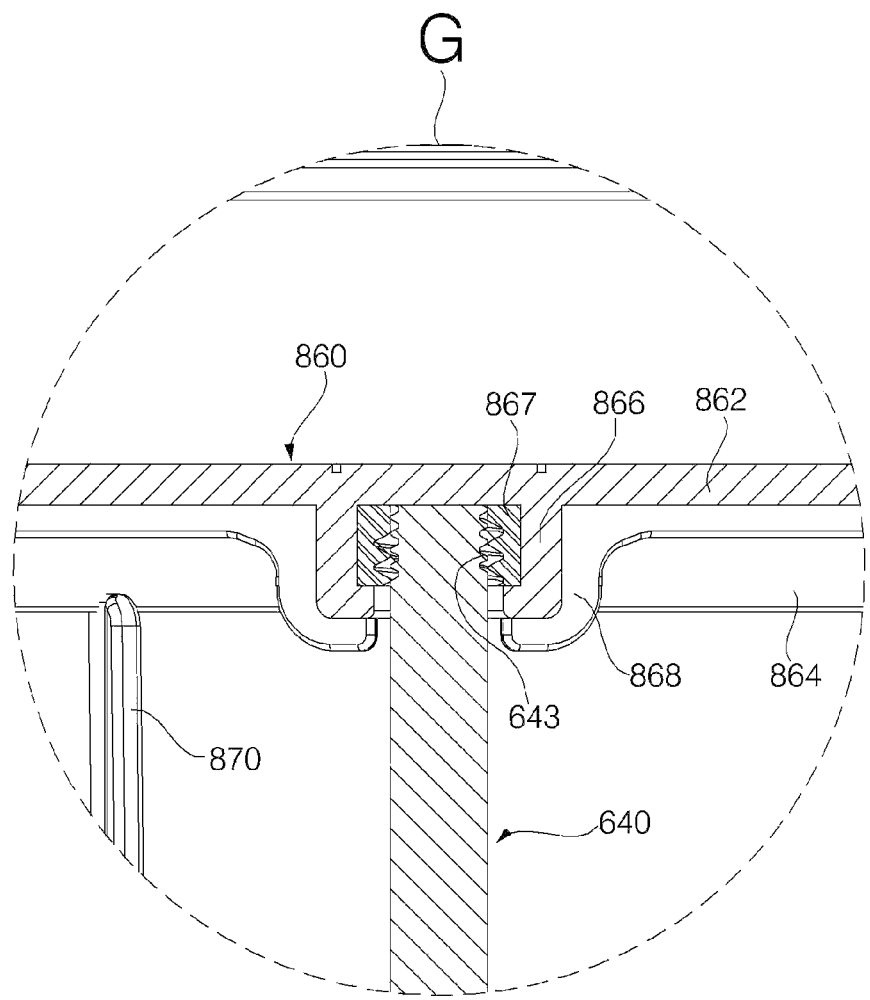
FIG. 9 is a magnified view of a portion G shown in FIG. 8.
Figure 10:
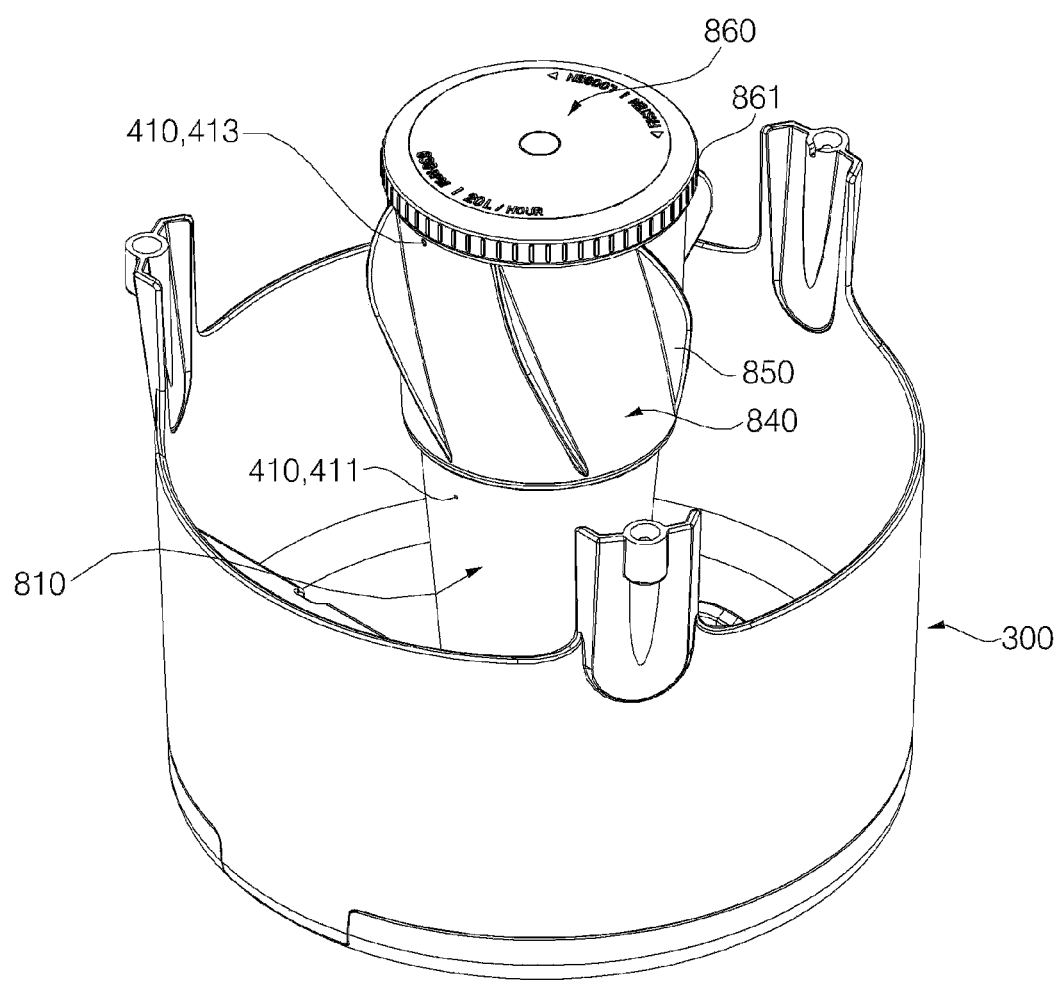
FIG. 10 is a perspective view illustrating an installation state of the watering housing shown in FIG. 4.
Figure 11:
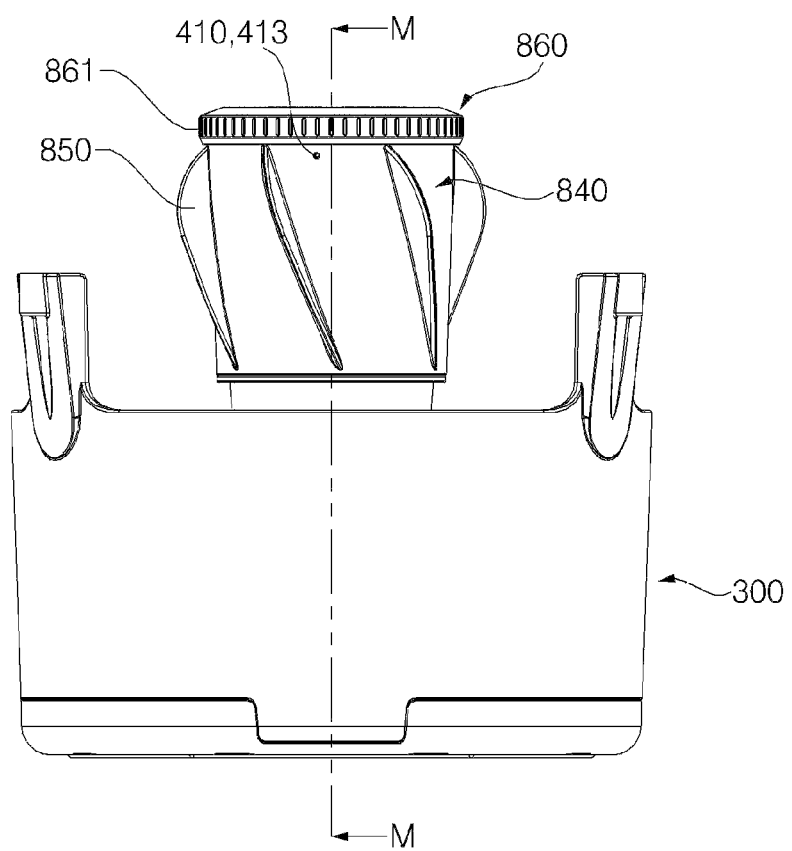
FIG. 11 is a front view of FIG. 10.
Figure 12:
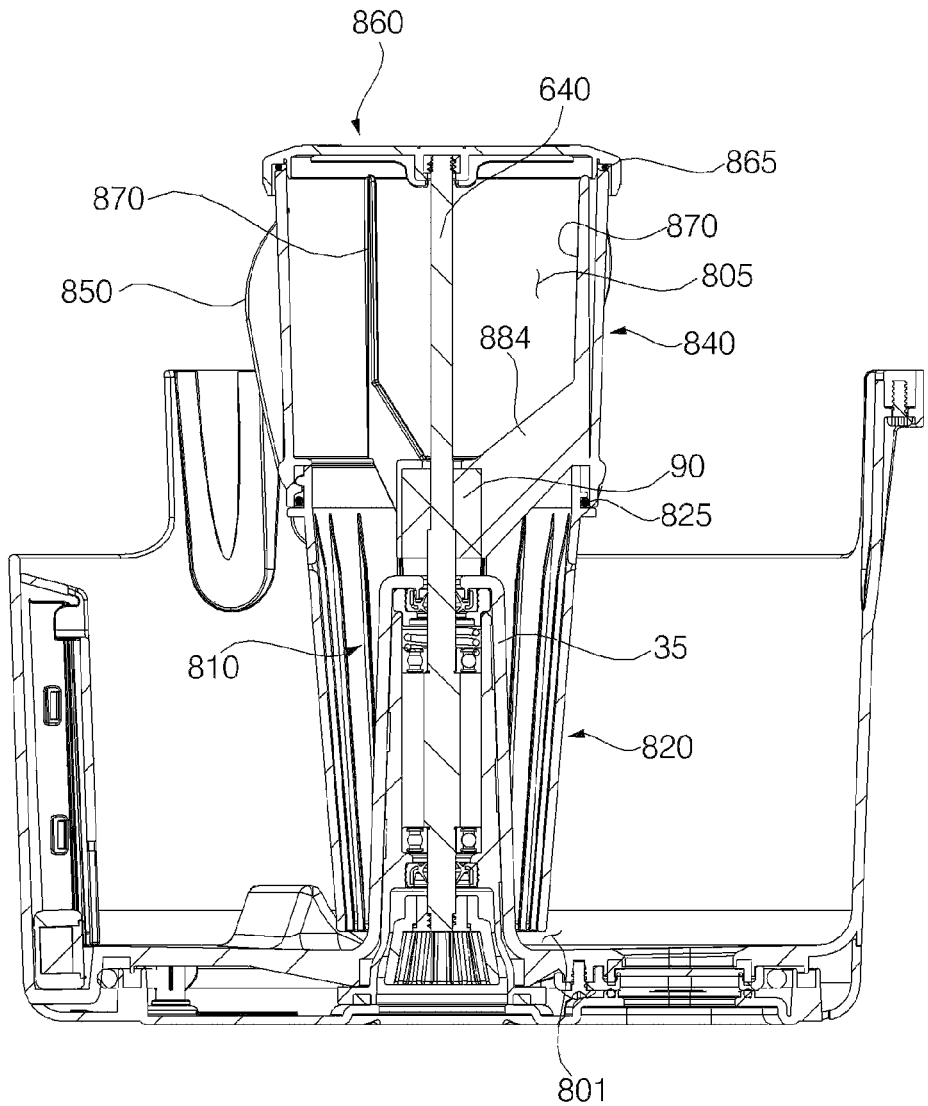
FIG. 12 is a cross-sectional view taken along line M-M of FIG. 11.
Figure 13:
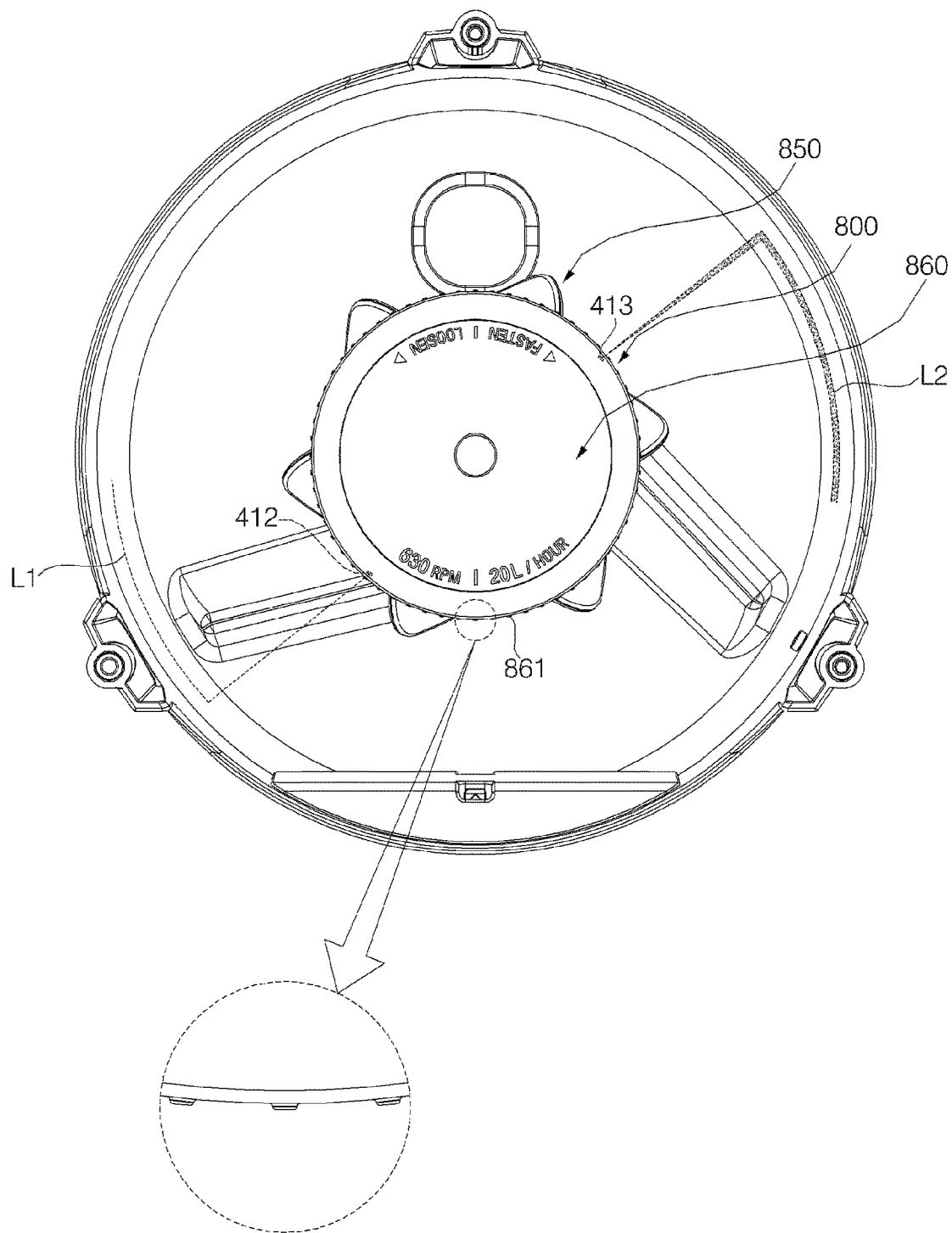
FIG. 13 is a plan view of FIG. 12.
Figure 14:
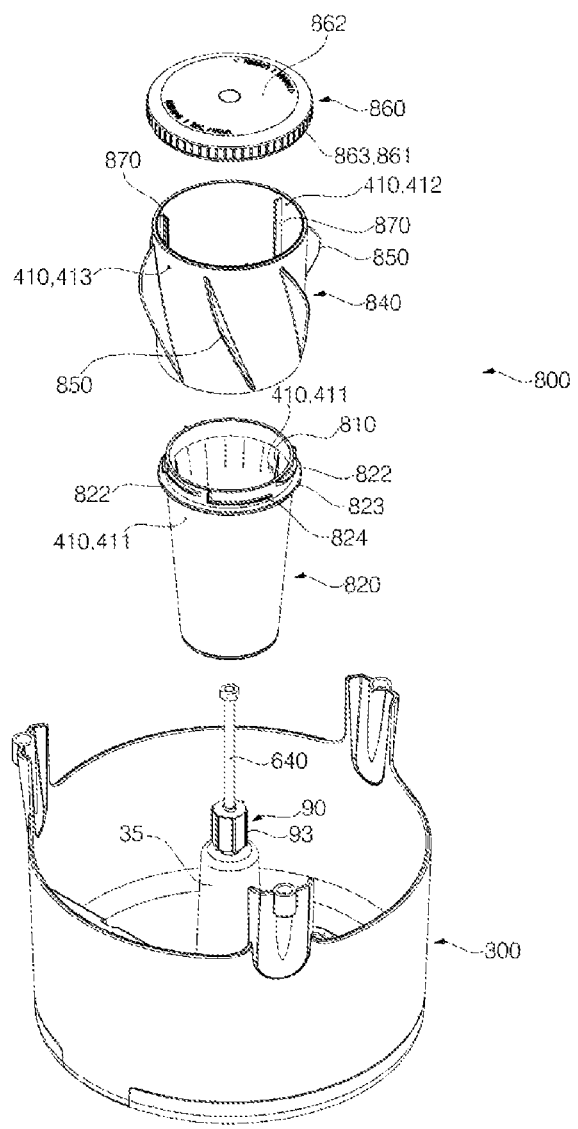
FIG. 14 is an exploded perspective view illustrating the watering housing shown in FIG. 10.
Figure 15:
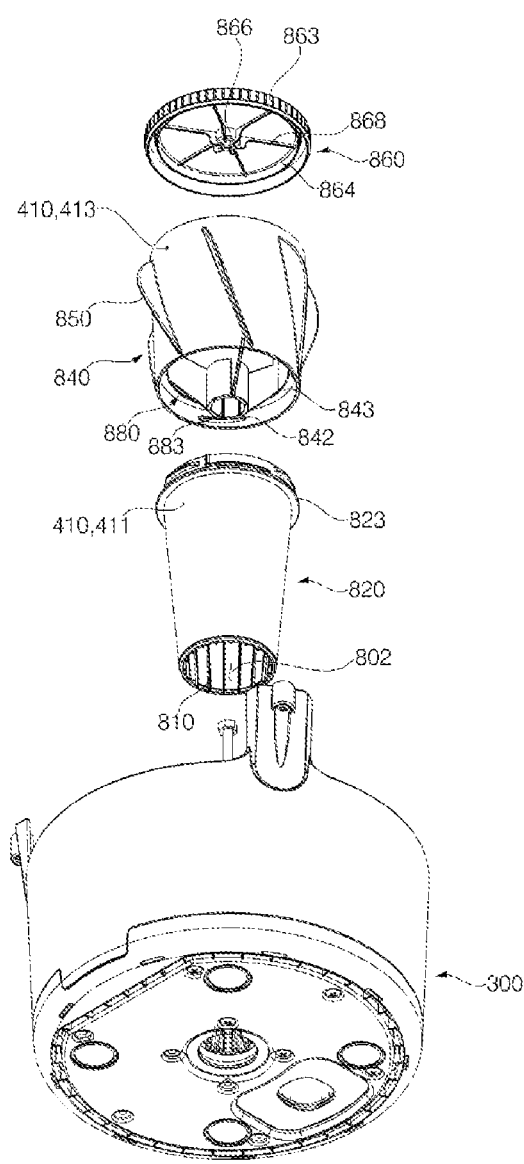
FIG. 15 is a perspective view illustrating the watering housing of FIG. 14 viewed from bottom.
Figure 16:
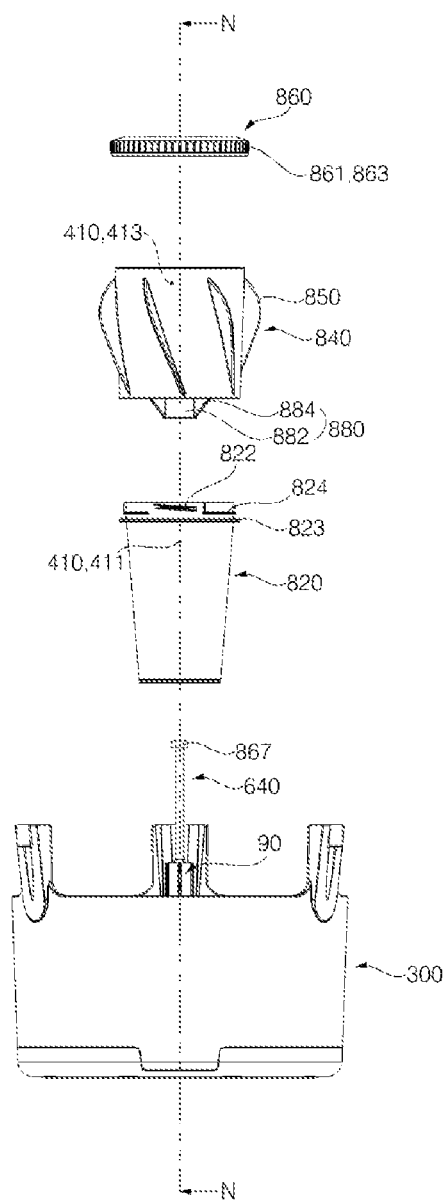
FIG. 16 is a front view of FIG. 14.
Figure 17:
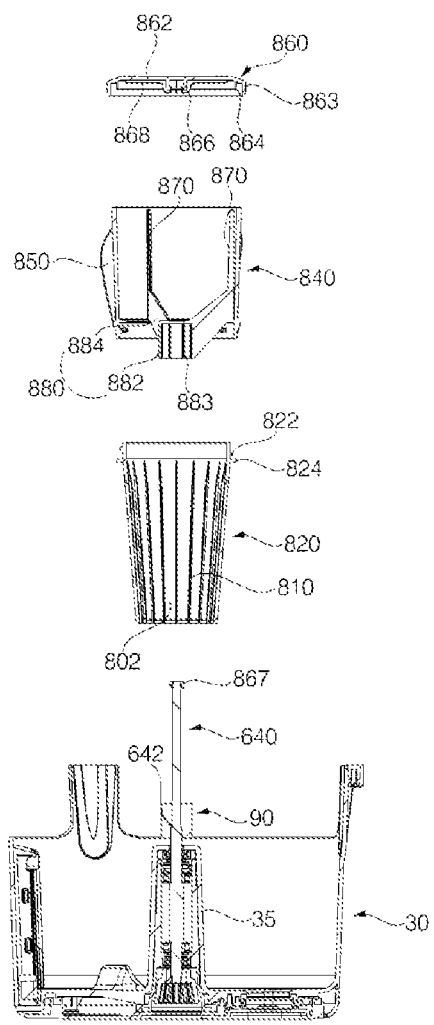
FIG. 17 is a cross-sectional view taken along line N-N of FIG. 14.

FIG. 8 is a cross-sectional view illustrating the air wash module shown in FIG. 4. FIG. 9 is a magnified view of a portion G shown in FIG. 8. FIG. 10 is a perspective view illustrating an installation state of the watering housing shown in FIG. 4. FIG. 11 is a front view of FIG. 10. FIG. 12 is a cross-sectional view taken along line M-M of FIG. 11. FIG. 13 is a plan view of FIG. 12. FIG. 14 is an exploded perspective view illustrating the watering housing shown in FIG. 10. FIG. 15 is a perspective view illustrating the watering housing of FIG. 14 viewed from bottom. FIG. 16 is a front view of FIG. 14. FIG. 17 is a cross-sectional view taken along line N-N of FIG. 14.

The watering housing 800 may be a configuration for spraying water stored in the water tank 300. The watering housing 800 may be a component for spraying water stored in the water tank 300.

The watering housing 800 may rotate by a torque of a watering motor 42, and upon rotation, may draw water stored in the water tank 300 and then pump water upward. Water pumped into the watering housing 800 may be discharged through a nozzle 410.

A pumping unit may be disposed in the watering housing 800. The pumping unit may upwardly pump water in water tank 300. The pumping of water in the water tank 300 may be implemented in various methods.

For example, water may be pumped by the pump, and then may be sprayed.

For example, the watering housing 800 may rotate, and upon rotation, may pump water through friction or mutual interference with water.

In this embodiment, a structure in which water is pumped through rotation of the watering housing may be proposed. In this embodiment, the pumping unit may be a pump groove 810 which upwardly push water through friction or mutual interference with water.

The pump groove 810 that is a pumping unit may be disposed on the inner side surface of the watering housing 800. The pump groove 810 may improve the pumping efficiency. The pump groove 810 may protrude from the inner side surface of the watering housing 800. The pump groove 810 may longitudinally extend in a vertical direction. The pump groove 810 may be radially disposed with respect to the watering motor shaft 43 or the power transmission shaft 640.

The lower end of the watering housing 800 may be spaced from the undersurface of the water tank 300 by a certain gap to form a suction gap (H1) 801. Water of the water tank 300 may be drawn into the watering housing 800 through the suction gap 801.

The water level H2 of the water tank 300 enabling the watering housing 800 to spray water may be higher than the suction gap H1 and lower than the nozzle 410. The water level H2 may include the full water level.

When the water level H2 is lower than the suction gap H1, water may not be drawn, and thus pumping may be impossible. When the water level H2 is higher than the nozzle 410, water pumped in the nozzle 410 may not be sprayed.

The watering housing 800 may be downwardly opened. The watering housing 800 may have a cup shape. The watering housing 800 may have an inverted cup shape. A housing space 805 may be formed inside the watering housing 800.

The column 35 of the water tank 300 may be located inside the watering housing 800, and a power transmission module 600 may be disposed inside the column 35. The watering housing 800 may be disposed to cover the column 35.

The watering housing 800 may be formed such that the horizontal section thereof gradually expands in an upward direction. The column 35 may be formed such that the horizontal section thereof is gradually reduced in an upward direction. The shapes of the watering housing 800 and the column 35 may be implemented in order to efficiently pump water. The capacity of housing space 805 may gradually increase in an upward direction.

When the watering housing 800 rotates, drawn water may adhere closely to the inner circumferential surface of the watering housing 800 by a centrifugal force. The pump groove 810 formed on the inner circumferential surface of the watering housing 800 may provide a torque to water drawn to the inside.

A nozzle 410 may be disposed in the watering housing 800 to discharge drawn water to the outside. In this embodiment, the nozzle 410 may be disposed so as to discharge water in a horizontal direction. Pumped water may be discharged through the nozzle 410.

In this embodiment, water discharged out of the nozzle 410 may be sprayed to the visual body 210.

The number of nozzles 410 may vary with the design conditions. In this embodiment, the nozzle 410 may be disposed in plurality while having different heights from each other in the watering housing 800. A nozzle that is disposed at an upper side of the watering housing 800 may be defined as a second nozzle, and a nozzle that is disposed at a middle side of the watering housing 800 may be defined as a first nozzle.

Water sprayed from the first nozzle may be used for humidification. Water sprayed from the second nozzle may be used for humidification, watering and rain view.

Water sprayed from the second nozzle may flow down to wet the water tank humidification medium.

Water sprayed from the second nozzle may hit the visual body, and then may be scattered to form a rain view. Water sprayed from the second nozzle may hit the visual body, and then may be changed into fine droplets. These droplets may be used for watering for washing filtered air.

When the watering housing 800 rotates at the same speed as and faster than a first rotation speed, water may be sprayed from the first nozzle. When the watering housing 800 rotates at the same speed as and faster than a second rotation speed, water may be sprayed from the second nozzle.

The second rotation speed may be larger than the first rotation speed.

Only when the watering housing 800 rotates at a high speed, water may be discharged out of the second nozzle. The watering housing 800 may be disposed such that water is not discharged through the second nozzle at a usual rotation speed. The first nozzle may discharge water in all stages where watering housing ordinarily operates.

The second nozzle may be disposed in plurality. The first nozzle may be disposed in plurality.

When the watering housing 800 rotates at a usual rotation speed, pumped water may rise at least higher than the first nozzle. When the watering housing 800 rotates at a high speed, pumped water may rise to the same height as and higher than the second nozzle.

The second nozzle may be disposed in plurality in a circumferential direction of the watering housing 800. The first nozzle may also be disposed in plurality in a circumferential direction of the watering housing 800.

When the watering housing 800 does not rotate, water may not be discharged through the nozzle 410. When a user operates only clean mode (air clean module operates but air wash module stops), the watering unit 40 may not operate, and only the air blowing unit 20 may operate. When a user operates only humidification mode, the watering housing 800 may rotate, and water may be discharged out of the nozzle 410. When a user operates both air cleaning mode and humidification mode, water discharged out of the nozzle 410 may be sprayed to the inner side surface of the visual body 210.

Since the watering housing 800 rotates, water discharged from the nozzle 410 may hit the inner side surface of the visual body 210, and then may flow along the inner side surface of the visual body 210.

A user may visually check through the visual body 210 that water is sprayed. This spraying of water may mean that humidification mode is operating. Through the spraying of water, a user can intuitively check that humidification mode is operating.

Droplets may be formed on the visual body 210 by sprayed water, and the droplets may flow down.

In this embodiment, the watering housing 800 may have three parts. Unlike this embodiment, the watering housing 800 may be manufactured into one or two components.

The lower end of the watering housing 800 may be disposed to be spaced from the undersurface of the water tank 300 by a certain gap.

The watering housing 800 may include a first watering housing 820, a second watering housing 840, a watering housing cover 860, and a watering power transmission unit 880.

The watering housing 800 may be assembled with the power transmission shaft 640, and may include a structure disposed therein and receiving a torque from the power transmission shaft 640. In the watering housing 800, the watering power transmission unit 880 and the watering housing cover 860 may be assembled with the power transmission shaft 640. The watering housing 800 may be connected to the power transmission shaft 640 at two points, and may receive a torque from the two points.

Unlike this embodiment, the watering housing 800 may be connected to the power transmission shaft 640 at one point, and may receive a torque from the point.

Unlike this embodiment, the watering housing 800 may receive a torque by a method other than the power transmission shaft. For example, the torque of the watering motor may be delivered by a belt-pulley method. For example, the torque of the watering motor may be delivered by a gear engagement method. For example, the torque of the watering motor may be delivered by a chain method. For example, the torque of the watering motor may be delivered by a clutch method.

The power transmission shaft 640 may have a screw thread 643 formed at the upper and lower ends thereof.

The screw thread 643 may be assembled with the watering housing cover 860. The lower screw thread may be assembled with a second coupler 620. A first coupler 610 may be disposed on the upper body 120 to be coupled to the second coupler 620.

The watering motor 42 may be disposed in the upper body 120. The watering motor 42 may provide a torque to the watering housing 800.

A coupler disposed in the air clean module 100 and coupled to the watering motor 42 may be defined as the first coupler 610. A coupler disposed in the air wash module 200 and separably coupled to the first coupler 610 may be defined as the second coupler 610.

One of the first coupler 610 and the second coupler 620 may have a male shape, and the other may have a female shape. In this embodiment the first coupler 610 may have a male shape, and the second coupler 620 may have a female shape. In this embodiment, the first coupler 610 may be separably coupled to and inserted into the second coupler 620. Unlike this embodiment, the second coupler 620 may be coupled to and inserted into the first coupler 610.

The watering motor 42 may be installed in the upper body 120. The watering motor 42 may be located over and spaced from the blower motor 22. The water tank 300 may be disposed in the upper body 120. When the water tank 300 is placed on the upper body 120, the first and second couplers 610 and 620 may be power-transmittably connected. The watering motor shaft 43 of the watering motor 42 may be disposed so as to face upward. The first coupler 610 may be installed on the upper end of the watering motor shaft 43.

Hereinafter, the configuration of the watering housing 800 will be described as follows.

The first watering housing 820 may have the upper and lower sides opened, and may have the pump groove 810 disposed therein. The lower end of the first watering housing 820 may be spaced from the undersurface of the water tank 300 by a certain gap to form a suction gap 801.

The second watering housing 840 may have the upper and lower sides opened, and may be assembled with the upper end of the first watering housing 820.

The watering housing cover 860 may be coupled to the upper end of the second watering housing 840, and may cover the upper surface of the second watering housing 840.

The watering power transmission unit 880 may be connected to at least one of the first watering housing 820 and the second watering housing 840 to receive a torque of the power transmission module 600. In this embodiment, the watering power transmission unit 880 may be connected to the first watering housing 820.

Unlike this embodiment, the first watering housing 820 and the second watering housing 840 may be integrally manufactured. Also, unlike this embodiment, the first watering housing 820 and watering housing cover 860 may be integrally manufactured.

The upper section of the first watering housing 820 may be larger than the lower section thereof. The first watering housing 820 may form an oblique in upward and downward directions. The first watering housing 820 may have a conical shape, a lower section of which is narrow.

The pump groove 810 may be disposed inside the first watering housing 820. The pump groove 810 may be formed in a vertical direction. The pump groove 810 may be radially disposed around the watering motor shaft 43. The pump groove 810 may be disposed in plurality, and may protrude to the axial center of the watering housing 800.

The lower end of the first watering housing 820 may be spaced from the undersurface of the water tank 300 to form the suction gap 801. The upper end of the first watering housing 820 may be coupled to the lower end of the second watering housing 840.

The first watering housing 820 and the second watering housing 840 may be assembled and disassembled. In this embodiment, the first watering housing 820 and the second watering housing 840 may be assembled through screw coupling. The first watering housing 820 may have a screw thread 822 formed on the outer circumferential surface of the upper side thereof, and the second watering housing 840 may have a screw thread 842 formed on the inner circumferential surface of the lower side thereof.

The screw thread 822 formed on the first watering housing 820 may be defined as a first thread 822, and the screw thread 842 formed on the second watering housing 840 may be defined as a second thread 842.

A first barrier 823 may be formed under the first thread 822 to restrict the movement of the second watering housing 840. The first barrier 823 may be formed in a circumferential direction of the first watering housing 820. The first barrier 823 may be formed into a strip shape, and may outwardly protrude from the first watering housing 820.

When the first watering housing 820 and the second watering housing 840 are assembled, the first barrier 823 may adhere closely to the lower end of the second watering housing 840. The first barrier 823 may outwardly protrude more than the first thread 822.

A first packing 825 may be disposed between the first thread 822 and the first barrier 823. The first packing 825 may prevent water from leaking between the first watering housing 820 and the second watering housing 840. The first packing 825 may be formed of an elastic material. The first packing 825 may have a ring shape.

A packing installation rib 824 may be disposed to fix the location of the first packing 825. The packing installation rib may be disposed on the extension line of the first thread 822. The packing installation rib 824 may be a portion of the first thread 822.

Accordingly, the first thread 822 may be formed in plurality, and may be discontinuously distributed. One of the first threads 822 may be the packing installation rib 824.

The first nozzle 411 may be disposed in the first watering housing 820. In this embodiment, two first nozzles 411 may be disposed. The two first nozzles 411 may be disposed so as to direct the opposite direction to each other.

The first nozzle 411 may communicate the inner and outer sides of the first watering housing 820. In this embodiment, the aperture area of the inside of the first nozzle 411 may be larger than the aperture area of the outside of the first nozzle 411. The first nozzle 411 may supply water to the water tank humidification medium 51, and may wet the water tank humidification medium 51. The first nozzle 411 may spray water to the water tank humidification medium 51.

A watering blade 850 may be formed on the outer circumferential surface of the second watering housing 840. The watering blade 850 may allow humidified air to flow. When the watering housing 800 rotates, the watering blade 850 may attract ambient air. The watering blade 850 may have a function as a rain view creating unit that atomizes droplets, as well as a function of allowing air to flow.

Air of the humidification flow passage 106 disposed in the watering housing 800 may mostly flow to the discharge flow passage 107 by the operation of the blower fan 24, but air around the watering blade 850 may flow in the opposite direction. The watering blade 850 may locally form air flow in the opposite direction of air flow by the blower fan 24. The watering blade 850 may also form air flow in the same direction as the blower fan 24 in accordance with the shape thereof. In this case, air around the watering housing 80 may gather on the surface of the watering housing 800 by the rotation of the watering blade 850.

The air flow by the watering blade 850 may have an effect of flowing water particles around the watering housing 800 into the water tank 300. The rotation of the watering blade 850 may generate the air volume, and may attract water particles around the watering housing 800.

The air flow by the watering blade 850 may serve to gather dropping water into the watering housing 800 when water drops from the water supply flow passage 109 to the upper part of the watering housing 800.

When the watering housing 800 rotates and water is supplied through the water supply flow passage 109, water may hit the surface of the watering housing 800 to be irregularly scattered. The air flow by the watering blade 850 may gather water particles scattering during water supply toward the surface of the watering housing 800.

The second watering housing 840 may include second nozzles 412 and 413 formed therein. The second nozzles 412 and 413 may spray water toward the visual body 210. In this embodiment, two second nozzles 412 and 413 may be disposed. One of the two second nozzles may be defined as a 2-1 nozzle 412, and the other may be defined as a 2-2 nozzle 413.

The 2-1 nozzle 412 and the 2-2 nozzle 413 may be disposed so as to face different directions. In this embodiment, the 2-1 nozzle 412 and the 2-2 nozzle 413 may be disposed so as to face the opposite directions to each other. The 2-1 nozzle 412 and the 2-2 nozzle 413 may be symmetrically disposed based on the power transmission shaft 640.

When viewed from top, the 2-1 nozzle 412 and the 2-2 nozzle 413 may form an angle of about 180 degrees. When viewed from top, the 2-1 nozzle 412 may be disposed between the watering blades 850. The 2-2 nozzle 413 may also be disposed between the watering blades 850.

When viewed from front, the height of the 2-1 nozzle 412 and the 2-2 nozzle 413 may be equal to or higher than the watering blade 850. A portion of the trajectory S3 and S4 of water sprayed from the 2-1 nozzle 412 and the 2-2 nozzle 413 may be located inside the radius of gyration of the watering blade 850.

Accordingly, when the watering housing 800 rotates, a portion of water sprayed from the 2-1 nozzle 412 and the 2-2 nozzle 413 may hit the watering blade 850 and may scatter.

In this embodiment, the 2-1 nozzle 412 and the 2-2 nozzle 413 may have a certain height difference. The 2-1 nozzle 412 and the 2-2 nozzle 413 may not be disposed at the same height.

Due to the height difference between the 2-1 nozzle 412 and the 2-2 nozzle 413, the location of water hitting the visual body 210 may be differently set. Accordingly, when the watering housing 800 rotates, water sprayed from the 2-1 nozzle 412 and water sprayed from the 2-2 nozzle 413 may pass different paths.

The trajectory S3 of water hitting the inner side surface of the visual body 210 from the second nozzles 412 and 413 may be defined as a spray line.

The spray line formed by the 2-1 nozzle 412 may be defined as a first spray line L1, and the spray line formed by the 2-2 nozzle 413 may be defined as a second spray line L2.

The spray line formed in the visual body 210 may not mean only a straight line. The spray line may also form a curved line in accordance with a discharge angle from the nozzle.

Also, the thickness of the spray line may vary with the diameter of the nozzle. In other words, when the diameter of the nozzle is large, the spray line may be thick, and when the diameter of the nozzle is small, the spray line may be thin.

In this embodiment, water sprayed from the 2-1 nozzle 412 may pass any one location of the visual body 210, and after a certain time, water sprayed from the 2-2 nozzle 413 may pass another location having a different height. That is, two spray lines L1 and L2 may be formed on the inner side surface of the visual body 210, and a user can more effectively recognize that water is sprayed through this visual show.

When water is discharged from the two second nozzles disposed at a certain height, only one spray line may be formed. When the watering housing 800 rotates at a high speed, a phase difference may be very shortly formed even though the first and second nozzles 142 and 143 are located at the opposite direction. In this case, an optical illusion that water flows down from one spray line may be caused.

Meanwhile, when two spray lines are formed, locations which water hits may differ. Accordingly, sounds generated by water hitting may be different. That is, a sound generated from the first spray line and a sound generated from the second spray line may be different. Due to this sound difference, a user can acoustically check that the watering housing 800 is rotating.

When only one spray line is formed, the same sound may be continuously generated. Accordingly, a user may not recognize the sound or may mistake the sound as a simple noise.

The sound differences through the plurality of spray lines may have an effect of efficiently delivering the operation situation to visual or hearing impaired persons. Also, even in a dark environment, it may be easy to check that the humidification and air cleaning apparatus is operating.

At least one of the second nozzles 412 and 413 may be disposed so as to be covered by the watering housing cover 860. In this embodiment, the 2-1 nozzle 412 may be disposed in a fully opened state, and the 2-2 nozzle 413 may be partially overlapped and covered by the watering housing cover 860.

The watering housing cover 860 may be located at the front of the 2-2 nozzle 413. The watering housing cover 860 may partially cover the upper side of the 2-2 nozzle 413.

In this embodiment, when the watering housing cover 860 is coupled to the second watering housing 840, the watering housing cover 860 may overlap a portion of the 2-2 nozzle 143. In this embodiment, the watering housing cover 860 may be used as a diffusion member. Unlike this embodiment, a separate diffusion member may be disposed to diffuse water sprayed from the nozzle.

For example, when the watering housing is injection-molded, a burr may be intentionally formed on the watering housing. Sprayed water may be diffused through the burr.

Water sprayed from the 2-2 nozzle 413 may interfere with the diffusion member, and thus may be changed in the spray angle and width. Water interfered with the diffusion member may be pulled toward the diffusion member by the surface tension.

In the 2-1 nozzle 412 which does not overlap with the diffusion member, the diameter of the nozzle may be formed similarly to the diameter of water that is discharged. In the 2-2 nozzle 413 which overlaps with the watering housing cover 860, water may be sprayed in a wider range than the diameter of the nozzle.

The trajectory of water sprayed from the 2-1 nozzle 412 may be defined as S3, and the trajectory of water sprayed from the 2-2 nozzle 413 may be defined as S4.

The 2-2 nozzle 413 may be located slightly higher than the 2-1 nozzle 412. The 2-2 nozzle 413 may partially overlap with a cover body border 863 of the watering housing cover 860 which is a diffusion member.

Since water sprayed through the 2-2 nozzle 413 is sprayed while interfering with the cover body border 863, sprayed water may be further broken into smaller particles.

Droplets sprayed from the 2-2 nozzle 413 may be smaller than droplets sprayed from the 2-1 nozzle 412. The trajectory S4 of droplets sprayed from the 2-2 nozzle 413 may be formed at a higher location than the trajectory of droplets sprayed from the 2-1 nozzle 412. Droplets sprayed from the 2-2 nozzle 413 may be sprayed more widely than droplets sprayed from the 2-1 nozzle 412. Accordingly, compared to the spray line L1 that 2-1 nozzle 412 forms, the spray line L2 that the overlapped 2-2 nozzle 413 forms may have a wider width.

Meanwhile, the watering blade 850 may allow air around the watering housing to flow, and may atomize water sprayed from the nozzle 410 into fine particles.

In this embodiment, water sprayed from the second nozzles 412 and 413 may collide with the watering blade 850 to be atomized into fine particles. The watering blade 850 may atomize water into a mist form.

The watering blade 850 may not atomize all water sprayed from the second nozzles 412 and 413. A portion of water sprayed from the second nozzles 412 and 413 may collide with the watering blade 850.

Water sprayed from the second nozzles 412 and 413 may form a certain trajectory S3, and the watering blade 850 that is rotating may collide with water on the trajectory S3. That is, a portion of water sprayed from the second nozzles 412 and 413 may collide with the watering blade 850 to be scattered, and the other portion of water may collide with the inner side surface of the visual body 210 instead of colliding with the watering blade 850.

Water colliding with the watering blade 850 may be widely scattered in the humidification flow passage 106, not in a specific direction. For example, water scattered from the watering blade 850 may wet the discharge humidification medium 55. Water scattered from the watering blade 850 may form water drops on the visual body 210. Water scattered from the watering blade 850 may float in the humidification flow passage 106.

Water atomized by the watering blade 850 may effectively show a rain view. The atomized droplets may be formed on the inner side surface of the visual body 210 in a small droplet form.

Instead of the watering blade 850, a rain view creating unit may be disposed between the watering housing 800 and the visual body 210. Water sprayed from the nozzle 410 may be hit on and scattered by the rain view creating unit. For example, a mesh may be disposed as a rain view creating unit between the visual body 210 and the watering housing 800. Water sprayed from the watering housing 800 may be broken into smaller droplets and then scattered while passing through the mesh.

Meanwhile, a rain view created in the humidification flow passage 106 may generate anions by the Lenard effect.

The Lenard effect refers to a phenomenon in which a large amount of negative ions is generated when water is atomized by a large external force.

In a process of creating a rain view, when droplets are scattered and collide with each other, a large amount of negative ions may be generated.

When water sprayed from the first nozzle 411 collides with a structure, negative ions may be generated by the Lenard effect.

Also, when water sprayed from the second nozzles 412 and 413 collides with the visual body 210, negative ions may be generated by the Lenard effect.

Also, when water sprayed from the second nozzles 412 and 413 collides with the watering blade 850, negative ions may be generated by the Lenard effect.

Also, upon water supply from the upper side, when droplets scattered in the watering housing cover 860 collide with various structures, negative ions may be generated by the Lenard effect.

Thus, in a process of generating various sizes of droplets for showing a rain view in this embodiment, there is an effect of generating negative ions. The negative ions that are generated may be discharged into the indoor through the discharge flow passage 107.

Meanwhile, a water curtain inhibiting rib 870 may be disposed in the second watering housing 840 to inhibit a water curtain rotation flow. The water curtain rotation flow may mean a flow rotating along the inner side surface of the watering housing 800.

The pump groove 810 of the first watering housing 820 may be for forming the water curtain rotation flow, and the water curtain inhibiting rib 870 may be for inhibiting the water curtain rotation flow.

In the first watering housing 820, since water needs to be pumped up to the second watering housing 840, the water curtain rotation flow may be actively generated. However, in regard to water raised up to the second watering housing 840, when the water curtain rotation flow is not formed, water may be easily sprayed through the second nozzles 412 and 413.

When a high-speed water curtain rotation flow is formed inside the second watering housing 840, water may not be discharged through the second nozzles 412 and 413, and may flow along the inside.

Also, when a larger amount of water stays in the second watering housing 840, the vibration of the watering housing may increases. Only when water pumped to the second watering housing 840 is quickly sprayed through the second nozzles 412 and 413, the eccentricity of the watering housing 800 can be minimized, and thus the vibration according thereto can be minimized.

The water curtain inhibiting rib 870 may minimize the water curtain rotation flow, and thus may serve to minimize the eccentricity and vibration of the watering housing 800.

The water curtain inhibiting rib 870 may protrude from the inner side surface of the second watering housing 840. In this embodiment, the water curtain inhibiting rib 870 may protrude toward the power transmission shaft 640. The water curtain inhibiting rib 870 may be formed in a direction of crossing the water curtain rotation flow.

The water curtain rotation flow may form a spiral form or circular form along the inner side surface of the second watering housing 840, and thus the water curtain inhibiting rib 870 may be formed in upward and downward directions.

In this embodiment, the water curtain inhibiting rib 870 may be formed in a vertical direction. The water curtain inhibiting rib 870 may be disposed in plurality. In this embodiment, three water curtain inhibiting ribs 870 may be disposed. The plurality of water curtain inhibiting rib 870 may be disposed at a uniform interval on the inner circumferential surface of the second watering housing 840.

In this embodiment, the water curtain inhibiting rib 870 may protrude by about 5 mm. The protrusion length of the water curtain inhibiting rib 870 may relate to the thickness of the water curtain rotation flow, and may be variously changed in accordance with embodiments.

In this embodiment, the water curtain inhibiting rib 870 may be connected to the watering power transmission unit 880. Unlike this embodiment, the water curtain inhibiting rib 870 and the watering power transmission unit 880 may be separately disposed.

In this embodiment, a mold can be simplified by manufacturing the water curtain inhibiting rib 870 so to be connected to the watering power transmission unit 880.

The watering power transmission unit 880 may be a component for delivering a torque of the power transmission shaft 640 to the watering housing 800.

In this embodiment, the watering power transmission unit 880 may be connected to the second watering housing 840. Unlike this embodiment, the watering power transmission unit 880 may also be connected to the first watering housing 820.

In this embodiment, the watering power transmission unit 880 may be manufactured integrally with the second watering housing 840. Unlike this embodiment, the watering power transmission unit 880 may be separately manufactured, and then may be assembled with the second watering housing 840.

The watering power transmission unit 880 may include a bushing installation part 882 located at the axial center of the watering housing 800, and a watering connection part 884 connecting the bushing installation part 882 and the watering housing 800. In this embodiment, the bushing installation part 882, the watering connection part 884, and the second watering housing 820 may be integrally injection-molded.

The watering connection part 884 may be manufactured into a rib shape. The watering connection part 884 may be radially disposed based on the axial center, and may be disposed in plurality.

In this embodiment, the watering connection part 884 may be manufactured integrally with the water curtain inhibiting rib 870. The watering connection part 884 and the water curtain inhibiting rib may be connected to each other.

The power transmission shaft 640 may be installed so as to penetrate the bushing installation part 882.

The lower side of the bushing installation part 882 may be opened. A bushing 90 may be inserted through the opened lower side of the bushing installation part 882.

The bushing installation part 882 and the bushing 90 may be separated in a vertical direction. The bushing installation part 882 and the bushing 90 may be subject to mutual stopping in a rotation direction.

For this, a bushing stopping part 93 may be formed on any one of the bushing installation part 882 and the bushing 90, and a bushing stopping groove 883 may be formed on the other. In this embodiment, the bushing stopping part 93 may be formed on the bushing 90, and the bushing stopping groove 883 may be formed in the bushing installation part 882.

The bushing stopping groove 883 may be formed in the inner side surface of the bushing installation part 882, and may have a concave shape. The bushing stopping part 93 may be formed on the outer surface of the bushing 90, and may have a convex shape.

The bushing stopping part 93 may be inserted and fitted into the bushing stopping groove 882.

Unlike this embodiment, the bushing installation part 882 and the bushing 90 may be integrally manufactured. Since the bushing 90 is formed of a metallic material, the bushing 90 may be disposed in the mold and then may be integrally manufactured by injection-molding the material of the second watering housing 840 when the second watering housing 840 is manufactured.

The bushing 90 may be coupled to the power transmission shaft 640 of the power transmission module 600.

The bushing 90 may be coupled to the power transmission shaft 640 to receive a torque. The bushing 90 may be formed of a metallic material. When the bushing 90 is not formed of a hard metallic material, abrasion may occur, thereby causing vibration.

The bushing 90 may have a bushing axis hollow formed therein and penetrating the bushing 90 in a vertical direction. The power transmission shaft 640 may be inserted into the bushing axis hollow.

When the watering housing 800 rotates, the bushing 90 may reduce vibration. The bushing 90 may be located on the power transmission shaft 640. In this embodiment, the bushing 90 may be located at the center of gravity of the watering housing 800. Since the bushing 90 is located at the center of gravity of the watering housing 800, the bushing 90 can significantly reduce the vibration of the watering housing 800 during the rotation.

The bushing 90 and the power transmission shaft 640 may be assembled by a fitting method. The bushing 90 may be supported by the power transmission shaft 640.

In order to support the bushing 90, the power transmission shaft 640 may include a shaft support end 642. The diameter at the upper side may be smaller than the diameter at the lower side based on the shaft support end 642.

The bushing 90 may be inserted through the upper end of the power transmission shaft 640.

In order to minimize abrasion, the shaft support end 642 may be formed into tapered, chamfered or rounded shape. When the shaft support end 642 is formed into a right-angled shape, abrasion may occur during the assembling process or the operation process.

When the shaft support end 642 is abraded, the bushing 90 may move, thereby causing vibration. Also, the shaft support end 642 is abraded, the bushing 90 may incline or move, and thus misalignment with the power transmission shaft 640 may occur. Also, when misalignment between the bushing 90 and the power transmission shaft 640, eccentricity may occur during rotation, and thus vibration may occur.

The watering housing cover 860 may be coupled to the upper side of the second watering housing 840, and may seal the upper side of the second watering housing 840. The watering housing cover 860 may be coupled to the second watering housing 840 by screw coupling.

In this embodiment, the watering housing cover 860 may be assembled with power transmission module 600. Unlike this embodiment, the watering housing cover 860 may be separate from the power transmission module 600.

When the watering housing cover 860 is coupled to the power transmission shaft 640, the eccentricity and vibration of the watering housing 800 can be more effectively reduced.

The watering housing cover 860 may include a cover body 862 covering the upper opening of the second watering housing 840, a cover body border 863 downwardly extending from the cover body 862 and covering the upper end of the second watering housing 840, a packing installation rib 864 disposed under the cover body 862 and spaced from the cover body border 863 by a certain gap, a shaft fixing part 866 fixed to the power transmission shaft 640, and a reinforcing rib 868 connecting the shaft fixing part 866 and the packing installation rib 864.

When viewed from top, the cover body 862 may have a circular shape. The diameter of the cover body 862 may be larger than the diameter of the second watering housing 840.

Unlike this embodiment, the cover body may not have a circular shape in top view. Also, the shape of the watering housing 800 in top view may not be limited to a specific shape.

The cover body border 863 may form the edge of the cover body 862. The cover body border 863 may be formed in a ring shape, and may be manufactured integrally with the cover body 862. The cover body border 863 may have a plurality of protrusions 861 formed on the outer surface thereof, and the protrusions 861 may be formed along the circumferential direction of 360 degrees of a circumference thereof. The protrusion 861 may provide a grip feeling for a user when the watering housing cover 860 is separated.

The protrusion 861 may effectively scatter dropping water during water supply from the upper side. Water dropping through water supply from the upper side may drop down on the watering housing cover 860, and may flow to the cover body border 863 by the rotation of the watering housing 800. Thereafter, water may be separated into a water drop form at the protrusion 861, and then may be scattered to the inner side surface of the visual body 210. The protrusion 861 may effectively scatter water supplied from the upper side.

The packing installation rib 864 may be located inside the cover body border 863, and may be spaced from the cover body border 863 by a certain distance. A second packing 865 may be disposed between the cover body border 863 and the packing installation rib 864.

The second packing 865 may seal a gap between the watering housing cover 860 and the second watering housing 840. Since the first packing 825 and the second packing 865 may interrupt leakage of water of the housing space 805, the pressure of water discharged through the nozzle 410 can be maintained constant.

When water leaks between the first watering housing 820 and the second watering housing 840, or when water leaks between the second watering housing 840 and the watering housing cover 860, it may be difficult to maintain a constant pressure of water discharged out of the nozzle 410.

That is, when a water leakage occurs at the watering housing 800, water may not be sprayed from the nozzle 410 even though the watering housing 800 is rotated.

The cover body border 863 and the second watering housing 840 may be screw-coupled. In this embodiment, the watering housing cover 860 and the second watering housing 840 may be assembled through tight fitting.

The shaft fixing part 866 may be assembled with the power transmission shaft 640, and may receive a torque from the power transmission shaft 640.

The shaft fixing part 866 and the power transmission shaft may be screw-coupled. For this, a screw thread 643 for screw coupling with the watering housing cover 860 may be formed on the outer circumferential surface of the upper end of the power transmission shaft 640.

A screw thread for assembling with the power transmission shaft 640 may be formed on the shaft fixing part 866. In this embodiment, a shaft fixing member 867 may be disposed on shaft fixing part 866, and the shaft fixing member 867 may be integrally double injection-molded on the shaft fixing part 866. In this embodiment, a nut may be used for the shaft fixing member 867.

Unlike the watering housing cover 860, the shaft fixing member 867 may be formed of a metallic material. Since the power transmission shaft 640 is formed of a metallic material, a part screw-coupled to the power transmission shaft 640 also needs to be formed of a metallic material to prevent abrasion or damage during coupling. When the whole of the watering housing cover 860 is formed of a metallic material, or when the shaft fixing part 866 is formed of a metallic material, it may be desirable to form a screw thread on the shaft fixing part 866 itself.

The watering housing cover 860 may have a diameter larger than the diameter of the second watering housing 840. When viewed from upper side, only the watering housing cover 860 may be exposed, and the second watering housing 840 and the first watering housing 820 may not be exposed.

Accordingly, at least a portion of water supplied to the water supply flow passage 109 may drop down on the watering housing cover 860. When the watering housing 800 rotates, water dropping on the watering housing cover 860 may be outwardly scattered from the surface of the watering housing cover 860 in a radiation direction.

The rotating watering housing cover 860 may spray supplied waster along the rotation direction, and an effect as if water drops from an umbrella can be achieved. Particularly, water drops may be broken away from the plurality of protrusions 861 which are disposed in a circumferential direction of the watering housing cover 860.

Water sprayed from the watering housing cover 860 in a rotation direction may collide with the inner side surface of the visual body 210, and may create a rain view.

The rain view may mean a situation in which droplets formed on the inner side surface of the visual body 210 flow down like rain drops.

In this embodiment, the watering groove 810 may be designed in a form of effectively pumping water in the water tank 300. In this embodiment, the watering groove 810 may be located under the nozzle 410. Particularly, the watering groove 810 may be disposed under the first nozzle 411.

The watering groove 810 may convert a horizontal torque of water into a vertical direction. When the watering groove 810 is formed, water may be more effectively pumped in a vertical direction.

In this embodiment, the watering groove 810 may be formed on the inner surface of the watering housing 800, may protrude toward the inside. The watering groove 810 may longitudinally extend in a vertical direction. Unlike this embodiment, the watering groove 810 may also be formed in a zigzag shape. In this embodiment, since the first watering housing 820 is manufactured by injection molding, a mold may be easily withdrawn by disposing the watering groove 810 in a vertical direction.

Figure 18:
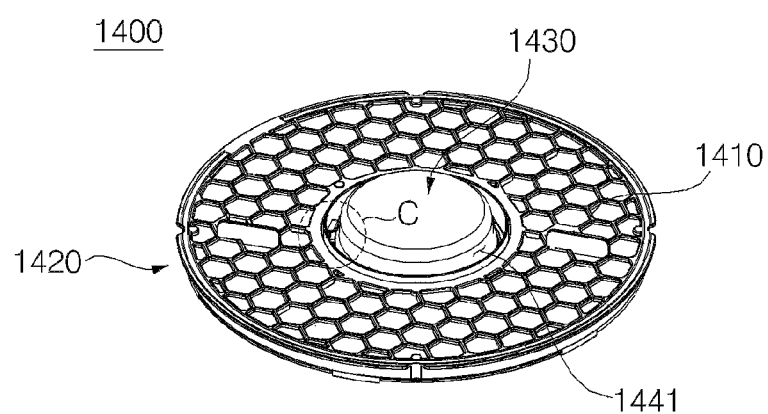
FIG. 18 is a perspective view illustrating the discharge humidification medium housing shown in FIG. 7.
Figure 19:
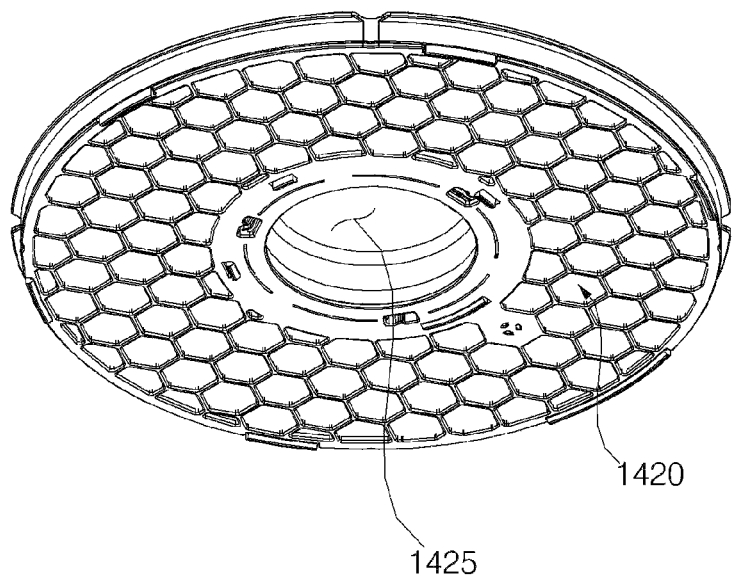
FIG. 19 is a perspective view illustrating the discharge humidification medium housing of FIG. 18 viewed from bottom.
Figure 20:
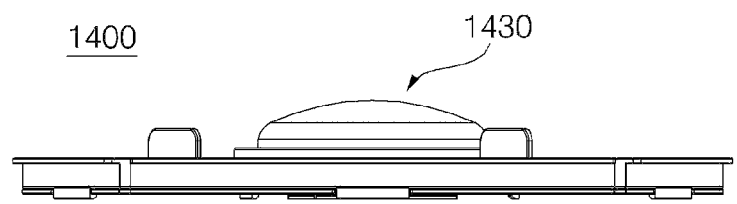
FIG. 20 is a front view of FIG. 18.
Figure 21:
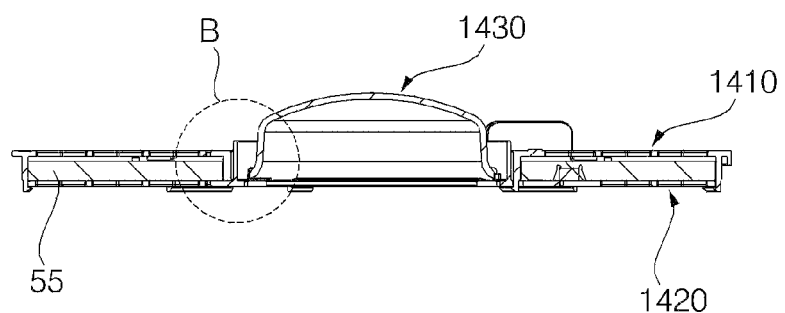
FIG. 21 is a cross-sectional view taken along line A-A of FIG. 20.
Figure 22:
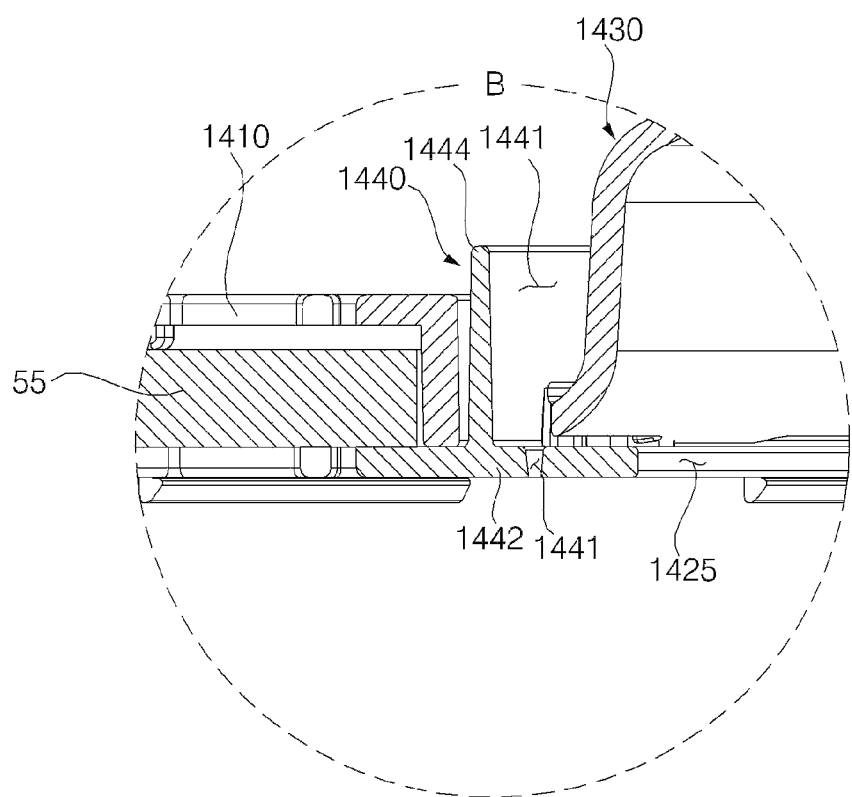
FIG. 22 is a magnified view of a portion B shown in FIG. 21.
Figure 23:
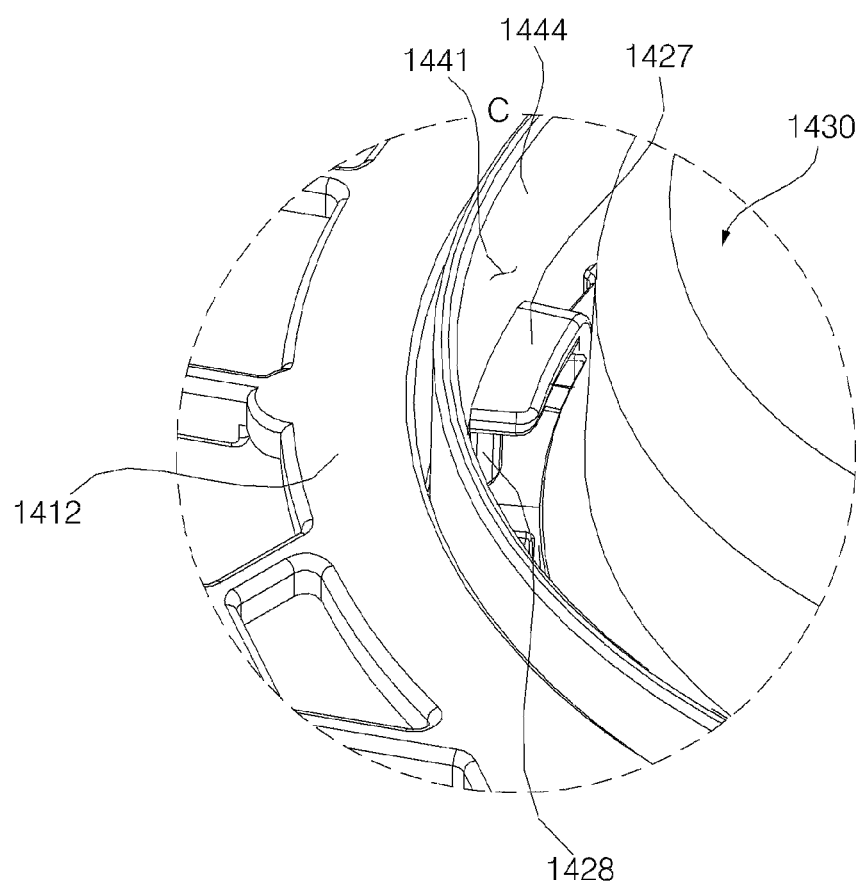
FIG. 23 is a magnified view of a portion C shown in FIG. 18.
Figure 24:
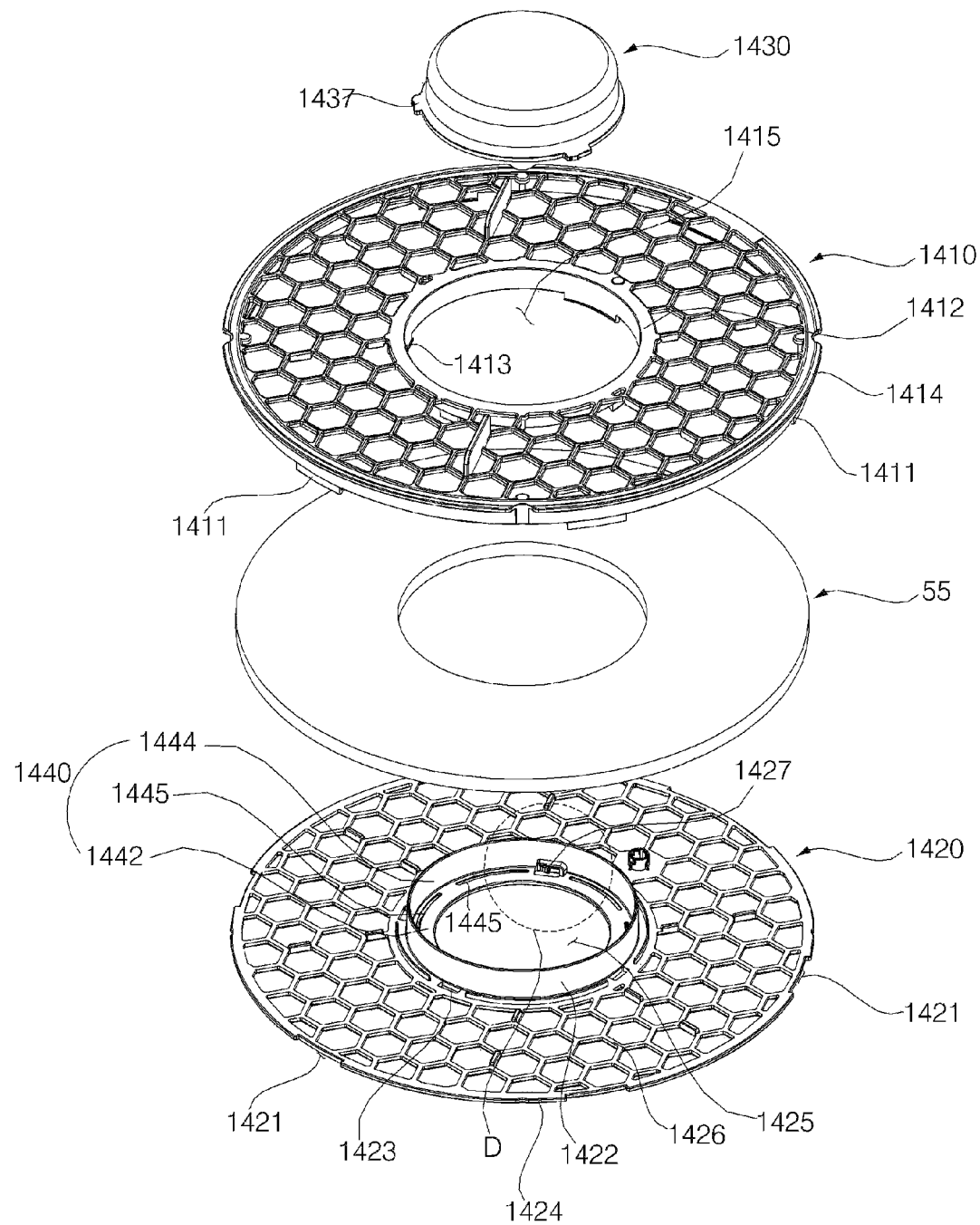
FIG. 24 is an exploded perspective view of FIG. 18.
Figure 25:
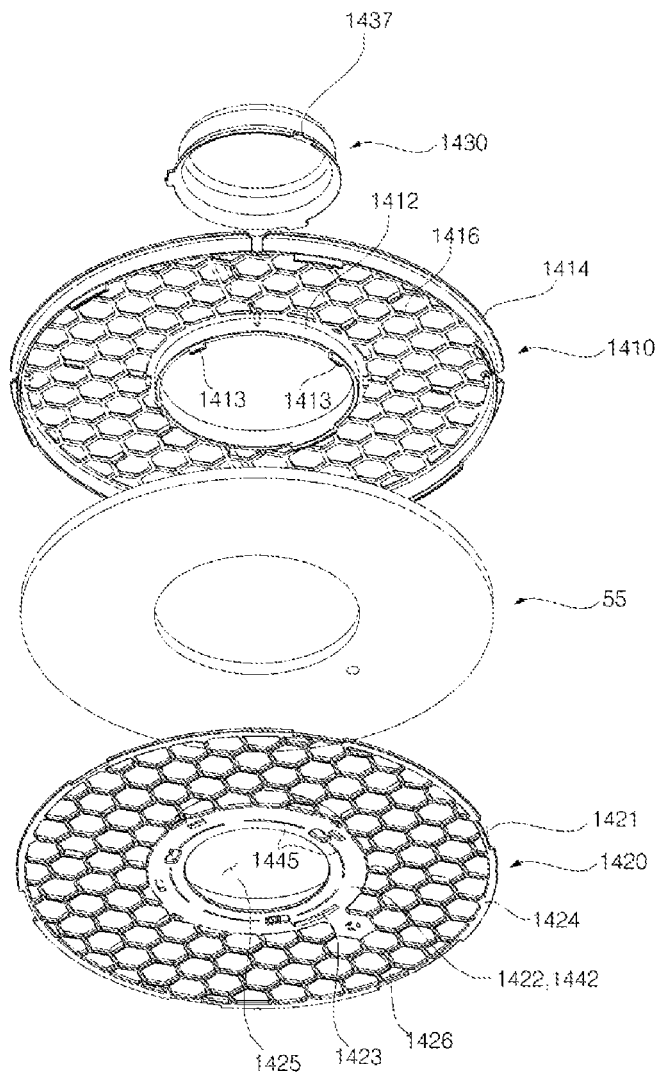
FIG. 25 is a perspective view of FIG. 24 viewed from bottom.
Figure 26:
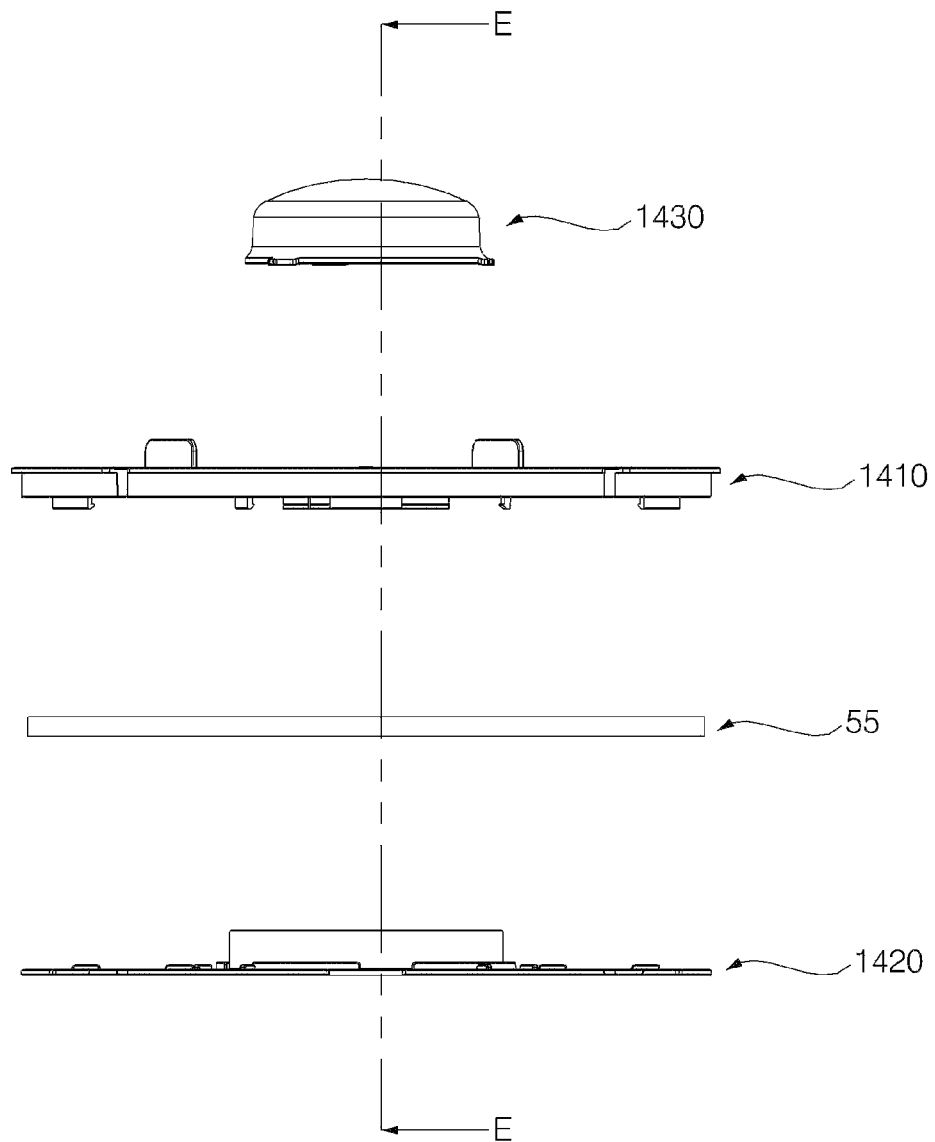
FIG. 26 is a front view of FIG. 24.
Figure 27:
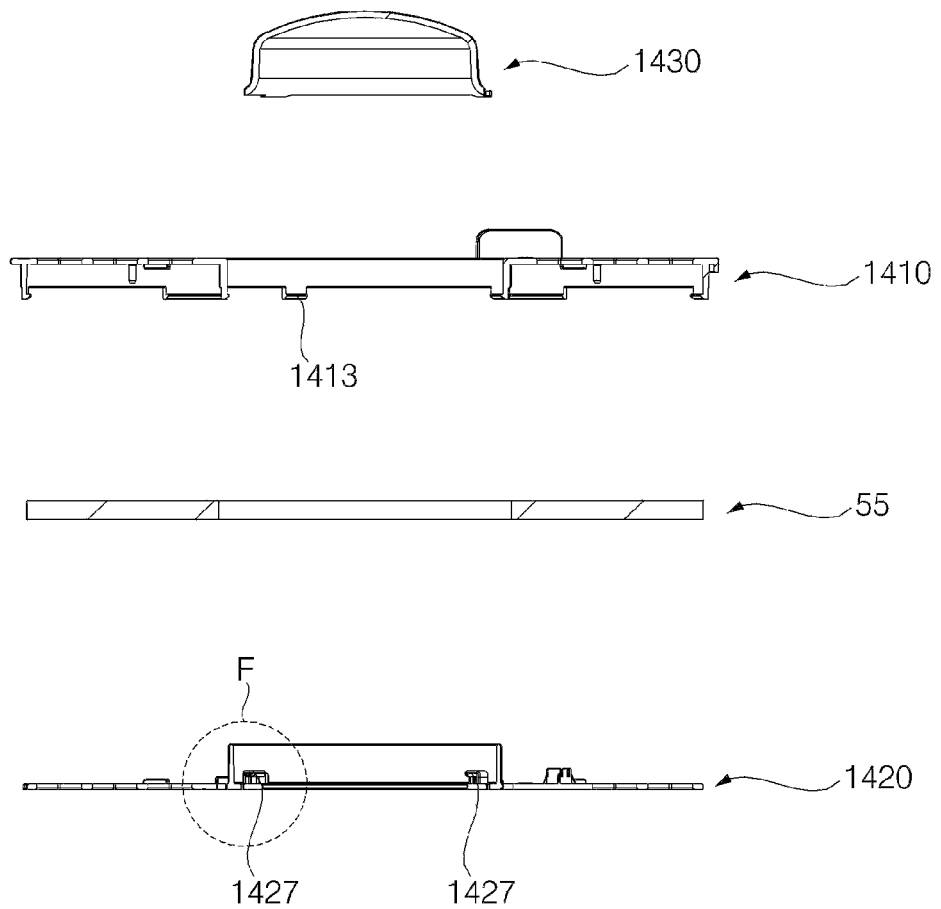
FIG. 27 is a cross-sectional view taken along line E-E of FIG. 26.
Figure 28:
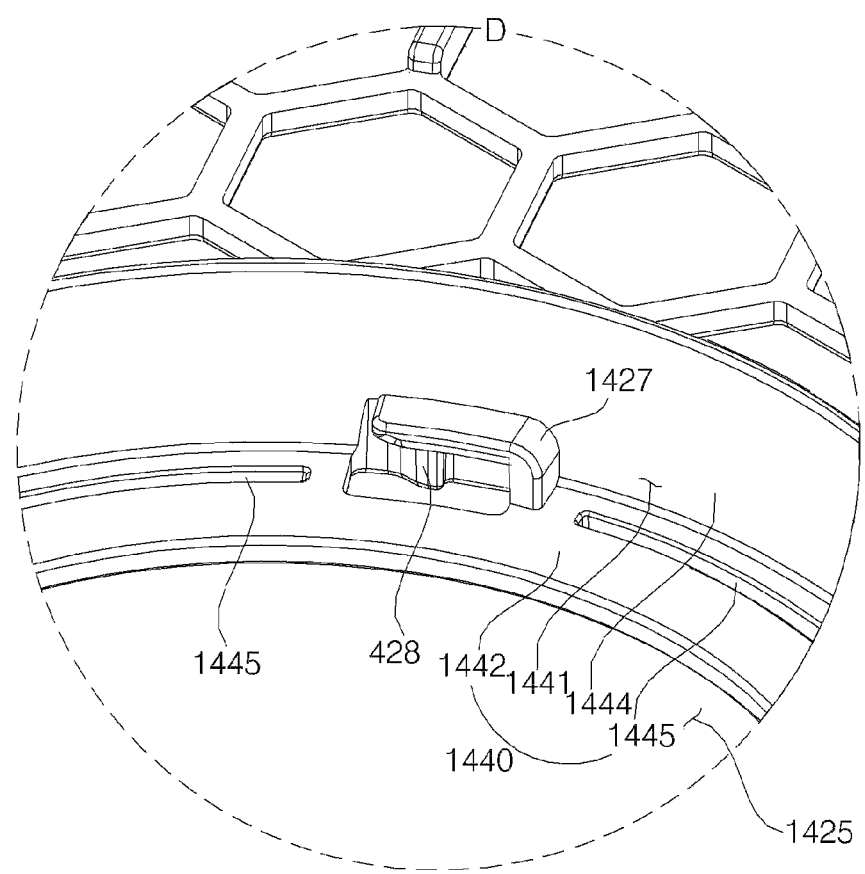
FIG. 28 is a magnified view of a portion D shown in FIG. 24.
Figure 29:
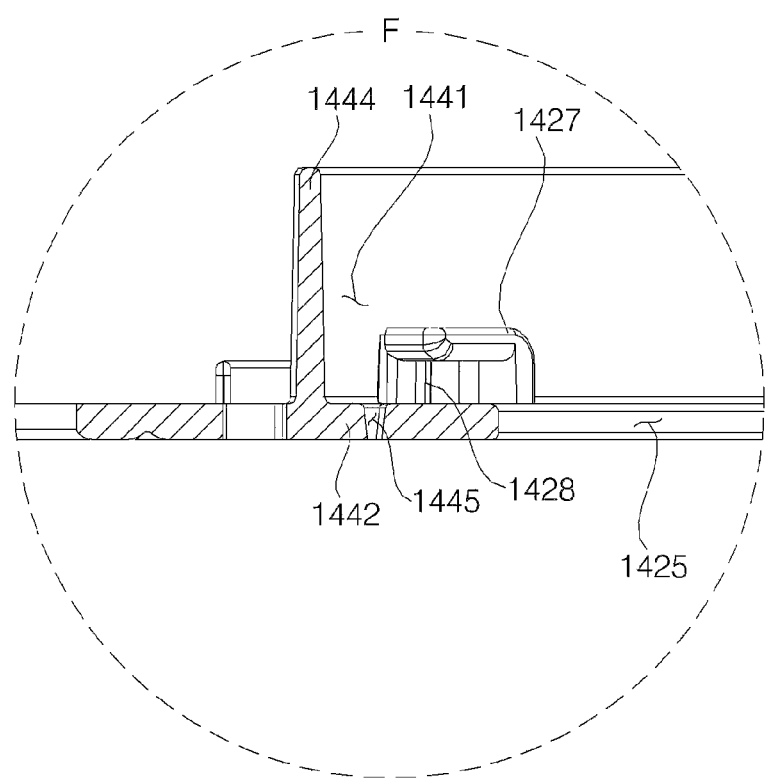
FIG. 29 is a magnified view of a portion F shown in FIG. 27.

FIG. 18 is a perspective view illustrating the discharge humidification medium housing shown in FIG. 7. FIG. 19 is a perspective view illustrating the discharge humidification medium housing of FIG. 18 viewed from bottom. FIG. 20 is a front view of FIG. 18. FIG. 21 is a cross-sectional view taken along line A-A of FIG. 20. FIG. 22 is a magnified view of a portion B shown in FIG. 21. FIG. 23 is a magnified view of a portion C shown in FIG. 18. FIG. 24 is an exploded perspective view of FIG. 18. FIG. 25 is a perspective view of FIG. 24 viewed from bottom. FIG. 26 is a front view of FIG. 24. FIG. 27 is a cross-sectional view taken along line E-E of FIG. 26. FIG. 28 is a magnified view of a portion D shown in FIG. 24. FIG. 29 is a magnified view of a portion F shown in FIG. 27.

Hereinafter, a discharge humidification medium housing will be described in more detail with reference to the accompanying drawings.

In this embodiment, a housing in which the discharge humidification medium 55 among the humidification medium 50 is installed may be defined as a discharge humidification medium housing 1400.

In this embodiment, the discharge humidification medium housing 1400 may be disposed over the discharge flow passage 107. The discharge humidification medium housing 1400 may be installed in the top cover assembly 230. The discharge humidification medium housing 1400 may be manufactured integrally with the top cover assembly 230.

In this embodiment, the discharge humidification medium housing 1400 may be manufactured separately from the top cover assembly 230. The discharge humidification medium housing 1400 may be disposed under the top cover assembly 230. The discharge humidification medium housing 1400 may be detachably coupled to the top cover assembly 230. In this embodiment, the discharge humidification medium housing 1400 may be placed over the visual body 210.

The top cover assembly 230 may form a portion of the water supply flow passage 109, and may expose a water supply cap 1430 to a user.

The discharge humidification medium housing 1400 may allow air to pass the outside thereof and may allow water to pass the inside thereof. Air may pass from lower side to upper side, and water may pass from upper side to lower side.

The discharge humidification medium housing 1400 may provide the discharge flow passage 107 through which air passes at the outside, and may provide the water supply flow passage 109 through which water passes at the inside.

The discharge humidification medium housing 1400 may include an upper housing 1410, a lower housing 1420, and a water supply cap 1430. The discharge humidification medium 55 may be disposed between the upper housing 1410 and the lower housing 1420.

The upper housing 1410 and the lower housing 1420 may have a plurality of air gaps formed therein.

The upper housing 1410 may have a donut shape on the whole.

The upper housing 1410 may include an upper inner frame 1412 disposed at the center thereof, an upper housing opening 1415 formed at the center of the upper inner frame 1412 and providing the water supply flow passage 109, an upper outer frame 1414 spaced from the upper inner frame 1412 and disposed at the edge thereof, and an upper mesh frame 1416 connecting the upper inner frame 1412 and the upper outer frame 1414.

The lower housing 1420 may have a donut shape on the whole.

The lower housing 1420 may include a lower inner frame 1422 disposed at the center thereof, a lower housing opening 1425 formed at the center of the lower inner frame 1422 and providing the water supply flow passage 109, a lower outer frame 1424 spaced from the lower inner frame 1422 and disposed at the edge thereof, and a lower mesh frame 1426 connecting the lower inner frame 1422 and the lower outer frame 1424.

The upper housing 1410 and the lower housing 1420 may have a shape corresponding to each other.

The upper housing opening 1415 and the lower housing opening 1425 may communicate with each other.

The upper housing 1410 and the lower housing 1420 may be assembled with each other. In this embodiment, the upper housing 1410 and the lower housing 1420 may be coupled to each other by a fitting method. For this, fitting protrusions 1411 and 1413 may be formed on any one of the upper housing 1410 and the lower housing 1420, and fitting grooves 1421 and 1423 may be formed in the other one.

In this embodiment, the fitting protrusions 1411 and 1413 may be formed on the upper housing 1410, and the fitting grooves 1421 and 1423 may be formed in the lower housing 1420. The fitting protrusions 1411 and 1413 may be formed on the upper outer frame 1414 and the upper inner frame 1412, respectively. The fitting grooves 1421 and 1423 may be formed in the lower outer frame 1424 and the upper inner frame 1422, respectively.

The water supply cap 1430 may be coupled to at least one of the upper housing 1410 and the lower housing 1420. In this embodiment, the water supply cap 1430 may be detachably fitted into the lower housing 1420. Unlike this embodiment, the water supply cap 1430 may also be detachably coupled to the upper housing 1410.

For the detachable coupling between the water supply cap 1430 and the lower housing 1420, a coupling protrusion 1437 and a coupling groove 1427 may be formed.

The coupling protrusion 1437 may be formed on any one of the water supply cap 1430 and the lower housing 1420, and the coupling groove 1427 may be formed in the other one. In this embodiment, the coupling protrusion 1437 may be formed on the water supply cap 1430, and the coupling groove 1427 may be formed in the lower housing 1420.

The coupling protrusion 1427 and the coupling groove 1427 may be horizontally coupled to each other by fitting coupling.

The coupling protrusion 1437 may outwardly protrude from the water supply cap 1430 in a radial direction. The coupling groove 1427 may be opened toward the center of the lower housing 1420.

Three coupling protrusions 1437 may be disposed in a uniform interval, and the coupling grooves 1427 may be formed so as to corresponding thereto. Also, a coupling protrusion stopping part 1428 may be formed in the coupling groove 1427 to provide mutual stopping with the coupling protrusion 1437. The coupling protrusion stopping part 1428 may provide mutual stopping with respect to a radial direction of the lower housing 1420.

The coupling protrusion stopping part 1428 may be formed so as to protrude toward the inside of the lower housing 1420 in a radial direction.

A user may insert the water supply cap 1430 into the lower housing opening 1425, and then may turn the water supply cap 1430 clockwise to couple the coupling protrusion 1437 to the coupling groove 1427. In the process where the coupling protrusion 1437 is coupled to the coupling groove 1427, a clicking sound and a good manipulation feeling may be generated while the coupling protrusion 1437 crosses over the coupling protrusion stopping part 1428.

Meanwhile, a water supply structure 1440 may be disposed in the discharge humidification medium housing 1400 to temporarily store water to be supplied and discharge stored water to a lower side.

The water supply structure 1440 may include a reservoir 1441 disposed over the water supply flow passage 109 and temporarily storing water, and a water outlet 1445 discharging water from the reservoir 1441 to the water tank 300.

The reservoir 1441 may also be formed in any one structure. In this embodiment, the reservoir 1441 may be formed by coupling a plurality of structures.

The reservoir 1441 may be formed in at least one of the upper housing 1410, the lower housing 1420 and the water supply cap 1430 which are disposed over the water supply flow passage 109. The reservoir 1441 may be formed by coupling with at least one of the upper housing 1410, the lower housing 1420 and the water supply cap 1430 which are disposed over the water supply flow passage 109.

In this embodiment, the reservoir 1441 may be formed by coupling of the lower housing 1420 and the water supply cap 1430.

The lower housing 1420 may include a reservoir base 1442 and a reservoir wall 1444.

The reservoir base 1442 and the reservoir wall 1444 may be formed on the lower inner frame 1422.

The reservoir base 1442 may be horizontally disposed, and the discharge humidification medium 55 may be disposed over the reservoir base 1442. The reservoir base 1442 may be connected to the lower mesh frame 1426.

The reservoir wall 1444 may upwardly protrude from the reservoir base 1442. The lower housing opening 1425 may be located inside the reservoir wall 1444, and the discharge humidification medium 55 may be disposed outside the reservoir wall 1444. The water supply cap 1430 may be located inside the reservoir wall 1444.

The reservoir 1441 may be formed inside the reservoir wall 1444, over the reservoir base 1442, and outside the water supply cap 1430.

The water outlet 1445, the fitting groove 1423, and the coupling groove 1427 may be formed in the reservoir base 1442. The water outlet 1445 and the fitting groove 1423 may be disposed inside the reservoir wall 1444, and the fitting groove 1427 may be disposed outside the reservoir wall 1444.

The water outlet 1445 may be formed in a form of slit. The water outlet 1445 may be opened in a vertical direction. When viewed from top, the water outlet 1445 may have an arc shape. The water outlet 1445 may be formed along the inner boundary of the reservoir wall 1444.

The width of the slit forming the water outlet may range from about 0.7 mm to about 0.8 mm, but the length thereof is not limited.

When viewed from the vertical section thereof, the water outlet 1445 may have a larger cross-sectional area at an upper side compared to a cross-sectional area at a lower side. The vertical section of the water outlet 1445 may have a hopper-like shape having a sharp lower end.

Through this sectional shape of the water outlet 1445, an airflow can be interrupted, and water can be discharged to the lower side.

When the humidification and air cleaning apparatus operates, air may flow from the humidification flow passage 106 to the discharge flow passage 107. Accordingly, a portion of air may also be discharged through the water outlet 1445. However, when water is stored in the reservoir 1441, air may not be discharged through the water outlet 1445. This is because the self-load of water stored in the reservoir 1441 is larger than the pressure of air.

When the section of the water outlet 1445 is wide, air may be discharged, and thus water stored in the reservoir 1441 may be scattered in an upward direction.

In the water supply structure 1440 according to this embodiment, when the humidification and air cleaning apparatus operates, water can be prevented from scattering from the reservoir 1441 in the opposite direction to the water supply even though water is supplied.

Air can be prevented from being discharged from the water outlet 1445 by controlling the capacity of the reservoir 1441. For example, the pressure by the self-load of water stored in the reservoir 1441 is configured to be larger than the pressure of wind dischargeable through the water outlet 1445.

In addition, the width of the water outlet 1444 manufactured in a form of slit is narrow, air may flow to the discharge humidification medium 55 due to a resistance. When the air gap of the discharge humidification medium 55 is larger than the cross-sectional area of the water outlet 1445, air may flow to the discharge humidification medium 55 exerting a smaller resistance. On the other hand, when water is stored in the reservoir 1441, water may be discharged through the water outlet 1445 due to the self-load of water.

Thus, air can be prevented from being discharged through the water outlet 1445 by various methods.

When a user supplies water onto the water supply cap 1430, supplied water may be temporarily stored in the reservoir 1441. Water stored in the reservoir 1441 may be downwardly discharged through the water outlet 1445. Water of the reservoir 1441 may also be discharged through the coupling groove 1427 formed in the reservoir base 1442. Water stored in the reservoir 1441 may also be discharged through the lower housing opening 1425.

When more water than the capacity of the reservoir 1441 is supplied, water may flow over the reservoir wall 1444. Even though water flows over the reservoir wall 1444, supplied water may drop or flow into the visual body 210. Water flowing down along the visual body 210 may also be guided into the water tank 300.

The humidification and air cleaning apparatus according to this embodiment has an advantage capable of supplying water into the water tank 300 regardless of the operation.

In this embodiment, although the discharge humidification medium housing 1400 is disposed under the top cover assembly 230, unlike this embodiment, the humidification and air cleaning apparatus may be configured without the configuration of the top cover assembly 230. For example, the discharge humidification medium housing 1400 in which the water supply cap 1430 is disposed may be exposed to the outside, and water supply from the upper side may be implemented by pouring water into the water supply cap 1430.

Hereinafter, the flow of water during the water supply from the upper side will be described in more detail.

Water supplied from the upper side may drop down through the top cover assembly 230.

In this embodiment, water dropping down from the top cover assembly 230 may not directly drop on the water surface of the water tank 300, and at least a portion of water may drop down on an upper part of the watering housing 800.

While the humidification and air cleaning apparatus is operating in humidification mode (when the watering housing is rotating), water supplied from the upper side may drop down on the watering housing 800, and then may scatter while forming a rain view.

When the humidification and air cleaning apparatus is stopped in humidification mode, or when the humidification and air cleaning apparatus is operating in air cleaning mode (when the watering housing is stopped), water supplied from the upper side may flow over the watering housing 800 into the water tank 300.

For example, regardless of the operation of the humidification and air cleaning apparatus, it may be possible to minimize direct dropping of water supplied from the upper side onto the water surface of the water tank 300, and thus the noise of dropping water can be minimized.

Due to the characteristics of water, water flowing along the undersurface of the discharge humidification medium housing 1400 among water supplied from the upper side may directly drop on the water surface. However, the amount of this water is small, thereby causing only a portion of noise. Particularly, after water formed on the undersurface of the discharge humidification medium housing drops down to a certain extent, water may be absorbed into the discharge humidification medium 55 by airflow of the humidification flow passage 106.

Water supplied from the upper side may drop on the watering housing cover 860 of the watering housing 800.

The diameter of the watering housing cover 860 may be formed to be larger than a diameter formed by the water outlets 1445 such that water supplied from the upper side drops on the watering housing cover 860.

The watering housing cover 860 may be disposed under the water outlet 1445. Also, the watering housing cover 860 may be disposed under the upper housing opening 1415 and the lower housing opening 1425.

That is, most water supplied from the upper side may drop on the watering housing cover 860.

When the watering housing 800 is rotating, water supplied from the upper side may outwardly scatter from the watering housing cover 860 in a radial direction. In order to effectively scatter water supplied from the upper side, the protrusions 861 may be formed on the watering housing cover 860. The protrusion 861 may be disposed in plurality along the edge of the watering housing cover 860. The protrusion 861 may outwardly protrude from the watering housing cover 860 in a radial direction.

When the watering housing 800 rotates, water supplied from the upper side may be separated into droplets from the protrusions 861.

Droplets separated from the protrusion 861 may collide with the inner side surface of the visual body 210. For this, the watering housing cover 860 may be disposed on the same horizontal line as at least a portion of the visual body 210. Considering that scattering droplets drops down due to gravity, the watering housing cover 860 may be disposed at an intermediate height of the visual body 210.

The protrusion 861 may be located over the second nozzles 412 and 413.

Droplets scattering from the protrusions 861 may create a rain view. A user can check that water is being normally supplied through a rain view created during the water supply from the upper side. Water supply from the upper side may be checked through a sound generated when scattering droplets collide with the visual body 210, as well as a visual effect such as a rain view.

The rain view sound generated during the water supply from the upper side may differ from a sound generated through the nozzle 410. The rain view sound generated during the water supply from the upper side may be louder and more irregular than a rain view sound generated during the pumping.

On this other hand, upon water supply from the upper side, various sizes of droplets may scatter from the watering housing cover 860.

In case of large droplets, droplets may scatter from the protrusion 861 to the inside of the visual body 210 due to the self-load thereof. In case of large droplets, droplets may form a relatively uniform trajectory S1 due to the self-load thereof.

The trajectory S1 may be different from the trajectory S3 of water sprayed from the nozzle 410.

The trajectory S3 of water sprayed from the second nozzles 412 and 413 may be different from the trajectory S1 of water scattering from the protrusion 861. The trajectory S1 may be higher than the trajectory S3.

In case of small droplets, droplets may be more influenced by airflow formed in the humidification flow passage than the self-load.

Accordingly, small droplets may float in the humidification flow passage 106. Since small droplets are simultaneously influenced by both wind pressure and gravity, the trajectory of small droplets may be irregular.

In case of small droplets, droplets may show a phenomenon of floating in the humidification flow passage 106 and being pulled near the watering housing 800.

The watering blade 850 of the watering housing 800 may pull floating droplets. The airflow by the watering blade 850 may pull floating or scattering droplets to the surface of the watering housing 800.

The watering blade 850 may form a water curtain S2 by pulling droplets scattering from the watering housing cover 860. During the water supply from the upper side, the water curtain generated around the watering housing 800 may vary with the amount of water supplied from the upper side.

The water curtain may be symmetrically formed about the watering housing 800.

Figure 30:
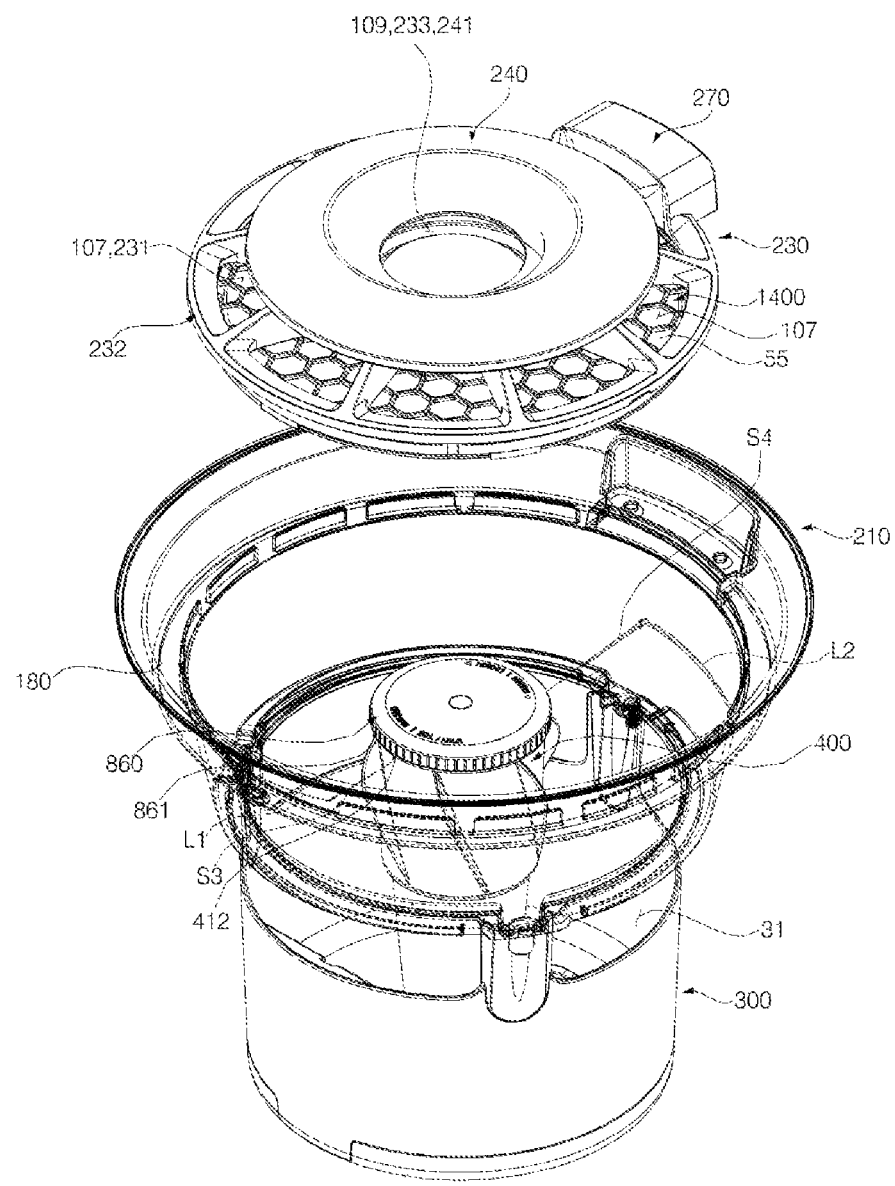
FIG. 30 is a view illustrating a spray line through a nozzle.
Figure 31:
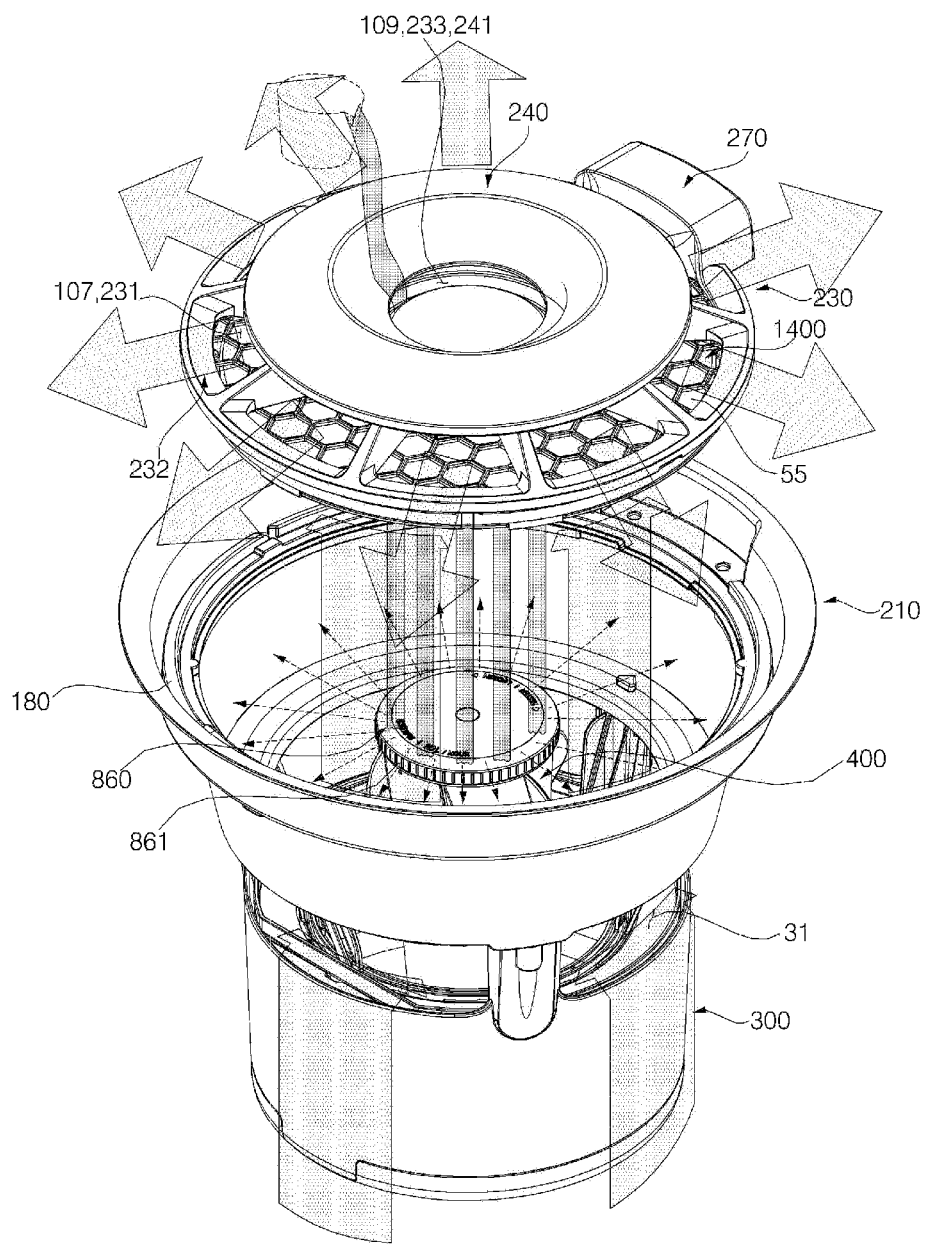
FIG. 31 is a view illustrating an air flow of the air wash module.
Figure 32:
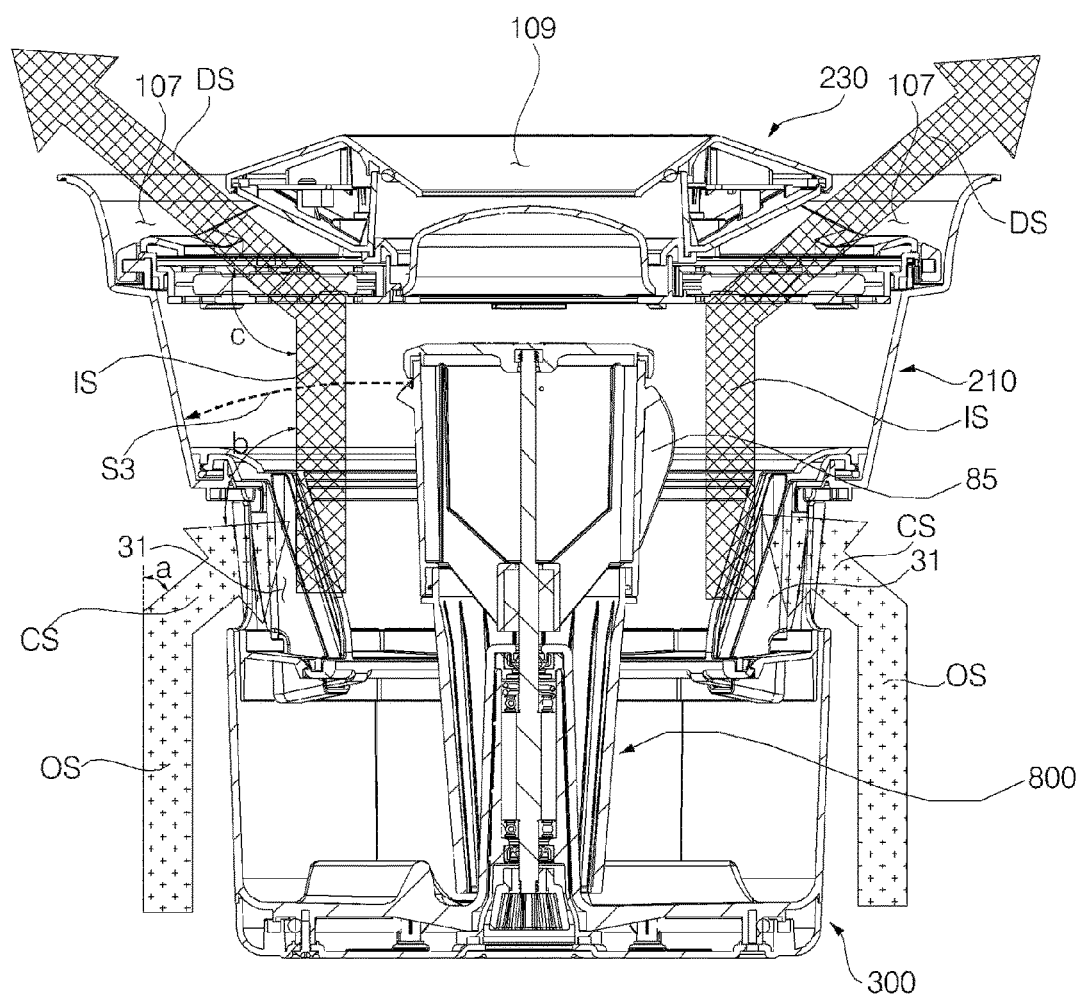
FIG. 32 is a view illustrating a trajectory of water sprayed through a 2-1 nozzle.
Figure 33:
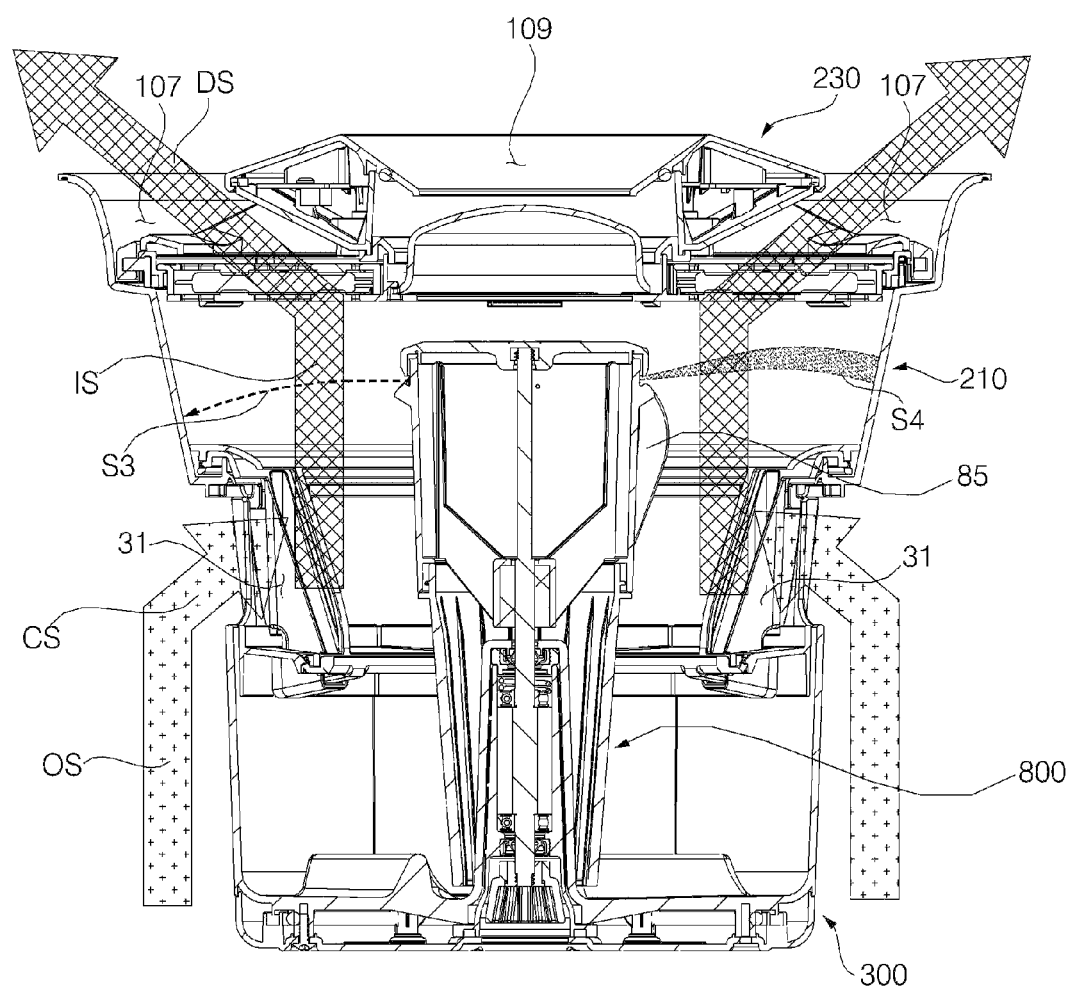
FIG. 33 is a view illustrating a trajectory of water sprayed through a 2-2 nozzle.
Figure 34:
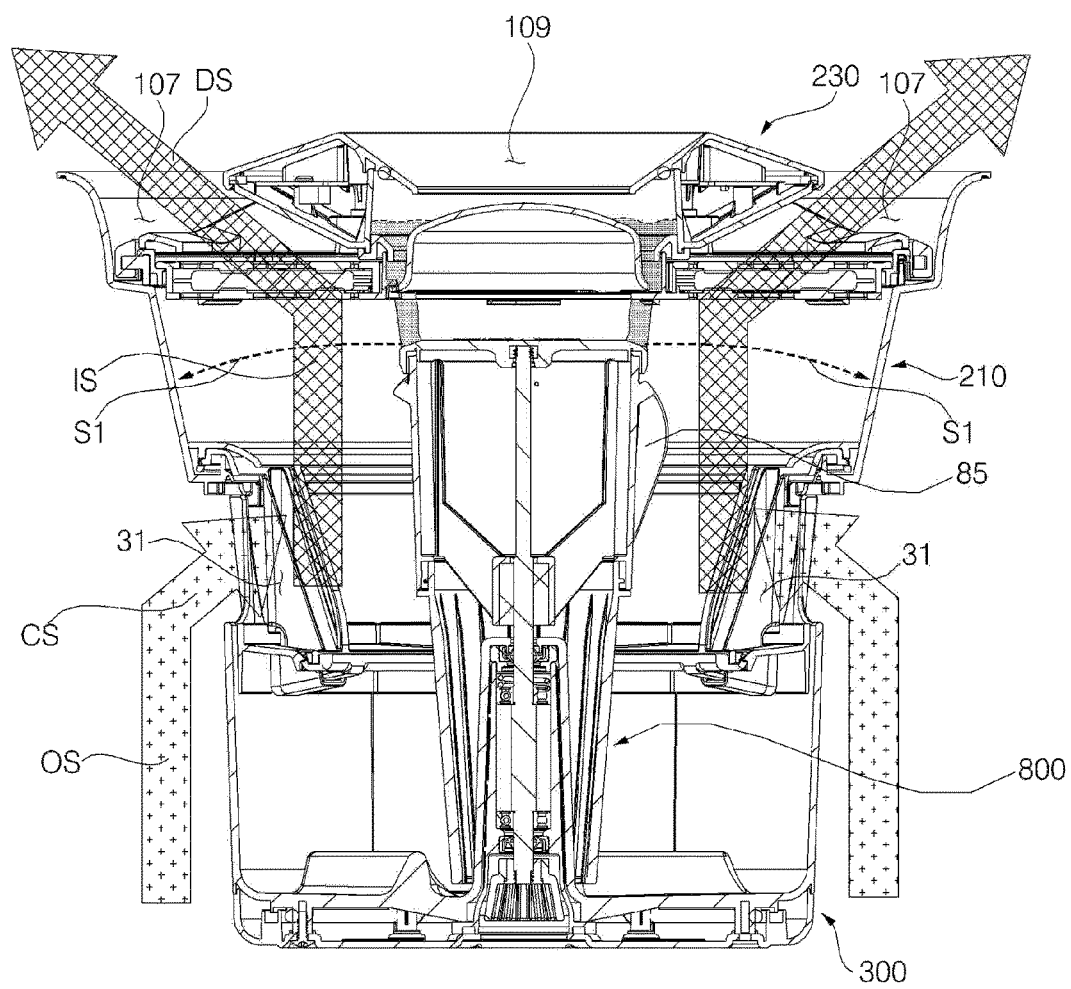
FIG. 34 is a view illustrating a trajectory of water by a watering housing upon water supply from the upper side.
Figure 35:
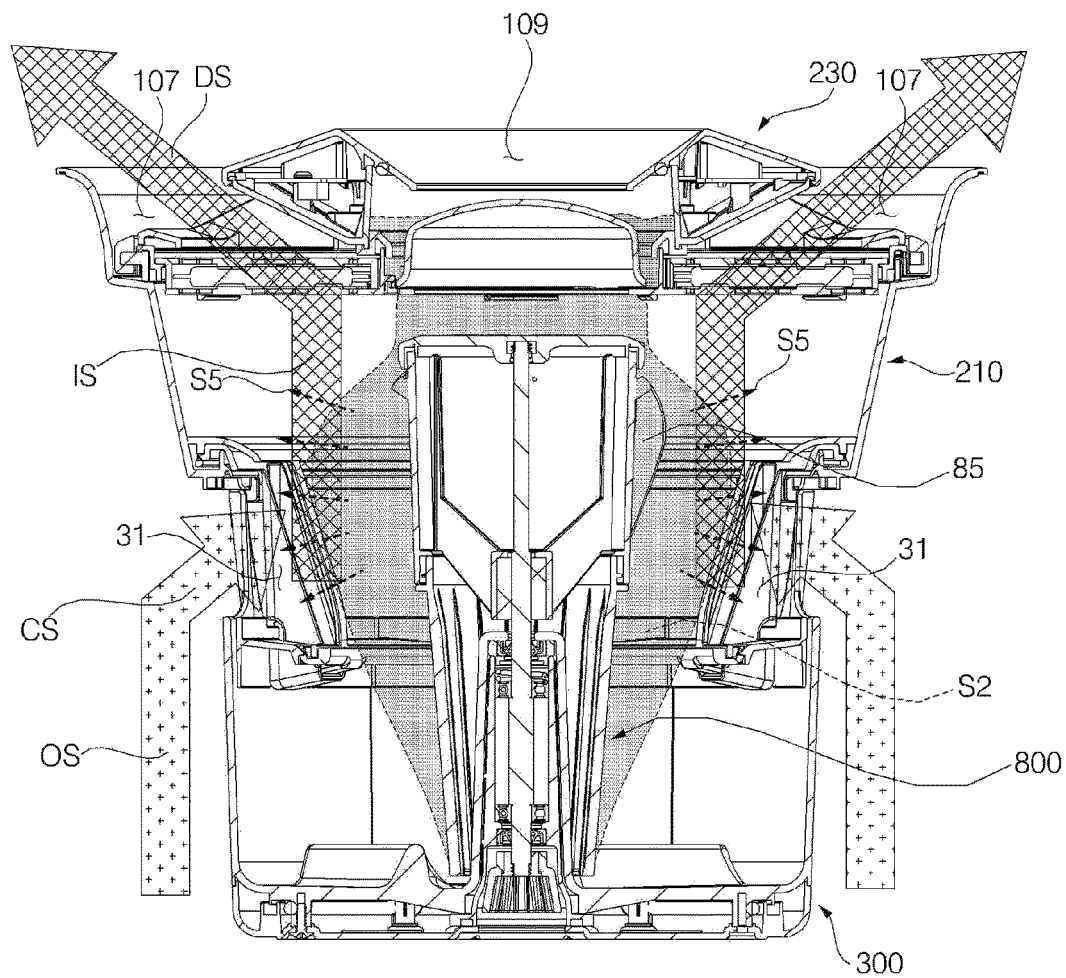
FIG. 35 is a view illustrating a trajectory of water by a watering blade upon water supply from the upper side.

FIG. 30 is a view illustrating a spray line through a nozzle. FIG. 31 is a view illustrating an air flow of the air wash module. FIG. 32 is a view illustrating a trajectory of water sprayed through a 2-1 nozzle. FIG. 33 is a view illustrating a trajectory of water sprayed through a 2-2 nozzle. FIG. 34 is a view illustrating a trajectory of water by a watering housing upon water supply from the upper side. FIG. 35 is a view illustrating a trajectory of water by a watering blade upon water supply from the upper side.

Hereinafter, a rain view shown in the air wash module 200 will be described in more detail. A rain view can be created by various methods.

First, a rain view can be created inside the visual body using water sprayed from the nozzle.

Second, a rain view can be created inside the visual body using water supplied from the upper side.

A rain view means the same effect as raining outside the window. A rain view means the same effect as forming rainwater. In this embodiment, the same effect as raining or forming rainwater inside the visual body 210 may be created.

When a rain view is created, various sizes of droplets may be formed. The watering blade 850, the first nozzle 411, the 2-1 nozzle 412, the 2-2 nozzle 413, the watering housing cover 860, the protrusion 861, and the blower fan 24 for airflow may be rain view creating units for creating droplets.

The first nozzle 411, the 2-1 nozzle 412, and the 2-2 nozzle 413 may be used when water pumped from watering unit 400 is sprayed. Water sprayed from the first nozzle 411, the 2-1 nozzle 412, and the 2-2 nozzle 413 may create a rain view.

The watering housing cover 860 or the protrusion 861 may create a rain view by scattering water dropping during the water supply from the upper side.

The wind pressure or the air volume by the blower fan 24 may allow sprayed or scattering droplets to be split into smaller sizes. Air flowing by the air blowing unit 20 may further atomize droplets while passing the water tank humidification medium 51.

Air flowing by the air blowing unit 20 may atomize air dropping in the humidification flow passage 106. Since air from the air blowing unit 20 moves in the opposite direction to gravity, dropping air and droplets due to the self-load may collide with air from the air blowing unit 20, and thus may be atomized.

Droplets generated by the rain view creating unit may flow or float in the humidification flow passage 106. The droplets of the humidification flow passage 106 may humidify flowing air, and may be formed on the inner side surface of the visual body in a form of water drop.

Water drops formed on the inner side surface of the visual body 210 may move along the slope of the inner side surface of the visual body 210.

The visual body 210 may be formed to incline to the water tank 300. The visual body 210 may be wider at an upper side thereof than at a lower side. Accordingly, the stay time of droplets flowing along the visual body 210 can be extended, and thus the rain view showing time can be extended. Also, due to the slope of the visual body 210, droplets that are formed thereon can be inhibited from flowing down. Due to the surface tension of droplets, droplet may be maintained at a state of being formed on the visual body 210. Also, airflow from the air blowing unit 20 may inhibit droplets from flowing down.

In addition, a water repellent coating may be formed on the inner side surface of the visual body 210. When the water repellent coating is formed, droplets may be prevented from widely spreading, and may be formed in a circular form.

When water drops are formed on the visual body 210, water drops formed on the visual body 210 may be projected onto or reflected by the surface of the display 160. When the water drops formed on visual body 210 flows down, the same effect is also shown on the display 160.

Actual droplets may move from an upper side to a lower side and from an outer side to an inner side along the slope of the visual body 210. Droplets reflected from the surface of the display 160 may move from a lower side to an upper side and from an outer side to an inner side in opposition to the slope of the display 160.

Accordingly, at a boundary where the visual body 210 meets the display 160, actual droplets may join reflected droplets. This joining may allow a user to more effectively recognize a rain view.

Hereinafter, an air flow around the air wash module 200 when a rain view is created will be described in more detail below.

First, air flowing outside the water tank 300 may be guided to the air wash inlet 31 through the connection flow passage 103. The flow of air flowing through the connection flow passage 103 is defined as an outer main stream OS. The outer main stream OS may be an air flow in the connection flow passage 103, and may mean a main flow direction of air outside the water tank 300.

The flow of air flowing toward the discharge port (grille discharge port in this embodiment) 231 inside the water tank 300 is defined as an inner main stream IS. The inner main stream IS may be an air flow in the humidification flow passage 106, and may mean a main flow direction of air inside the water tank 300.

The outer main stream OS may be formed in a direction from a lower side to an upper side. The inner main stream IS may also be formed in a direction from a lower side to an upper side. The outer main stream OS and the inner main stream IS may have the same direction. Since the outer main stream OS and the inner main stream IS have the same direction, the flow resistance of air may be minimized.

The air wash inlet 31 may be disposed between the outer main stream OS and the inner main stream IS, and the air wash inlet may connect the outer main stream OS and the inner main stream IS.

When the outer main stream OS passes the air wash inlet 31, the flow direction of air may be changed. The flow of air passing the air wash inlet 31 is defined as a connect stream CS. The connect stream CS may mean a main flow direction of air flowing from the outside of the water tank 300 to the inside of the water tank 300.

When the inner main stream IS passes the discharge flow passage 107, the flow direction of air may be changed. The flow of air passing the discharge flow passage 107 is defined as a discharge stream DS. The discharge stream DS may mean a main flow direction of air flowing from the inside of the water tank 300 to the outside of the top cover assembly 230.

The connect stream CS may form an included angle with the outer main stream OS and the inner main stream IS, respectively.

The outer main stream OS and the inner main stream IS may flow from a lower side to a lower side. The outer main stream OS and the inner main stream IS may flow in a direction opposite to gravity.

The connect stream CS may flow from the outside to the inside of the water tank 300. The connect stream CS may form an included angle a of 0 to 90 degrees with the flow direction of the outer main stream OS. Also, the connect stream CS may form an included angle b of 90 to 180 degrees with the flow direction of the inner main stream IS.

The discharge stream DS may flow from the inside to the outside of the water tank 300. The discharge stream DS may direct to the upper side of the water tank, and may incline to the outside in a radial direction.

The discharge stream DS may form an included angle c of 90 to 180 degrees with the flow direction of the inner main stream IS.

The flow resistance of air may be minimized by allowing the included angles a, b and c to be close to a straight line.

Particularly, the connect stream CS may penetrate the water tank humidification medium 51 when passing the air wash inlet 31. When the connector stream CS penetrates the water tank humidification medium 51, air forming the connect stream CS may be humidified.

Also, the discharge stream DS may penetrate the discharge humidification medium 55 when passing the discharge flow passage 107. When the discharge stream DS penetrates the discharge humidification medium 55, air forming the discharge stream DS may be humidified.

The inner main stream IS may cross the trajectories of water sprayed from the nozzles 411, 412 and 413. The inner main stream IS may orthogonally cross the trajectory of sprayed water.

Also, the inner main stream IS may orthogonally cross the trajectory of water scattered from the watering housing cover 860. The inner main stream IS and the trajectory of scattering water may orthogonally cross each other.

Also, the inner main stream IS may orthogonally cross the trajectory of water scattered from the watering blade 850.

Since the inner main stream IS cross the respective trajectories of water creating a rain view, humidified air can be effectively washed. When the trajectories of water are disposed in the same direction as the inner main stream, humidified air may not be effectively washed.

Particularly, since droplets atomized after colliding with the visual body 210 may drop down in a gravity direction and the inner main stream IS moves in a direction opposite to gravity, humidified air can be more effectively washed. In the washing process, additional humidification may also be performed.

Also, since atomized droplets are floated by the inner main stream IS, the stay time of atomized droplets at a height of the visual body 210 can increase.

In regard to the locations of the components of the air wash module 200, water may be stored at a lower portion of the air wash module 200, and the components for circulating water may also be disposed at the lower portion of the air wash module 200.

Accordingly, the watering housing 800 may be coupled to a lower part of the air wash module 200, and a power transmission module 600 may be disposed to deliver a torque to the watering housing 800.

A component for humidification may be disposed at a central portion of the air wash module 200. Accordingly, the air wash inlet 31 and the water tank humidification medium 51 may be disposed at a central portion of the air wash module 200.

A component for a rain view and a component for water discharge/supply may be disposed at an upper portion of the rain view 200. Accordingly, the nozzles 412 and 413, the visual body 210, and the watering housing cover 860 which can create a rain view may be disposed at the upper portion of the air wash module 200. Particularly, through a rain view created at the upper portion of the air wash module 200, humidified air may be washed once again before air is discharged.

Also, the top cover assembly 230 for air discharge and water supplied from the upper side may be disposed at an upper portion of the air wash module 200.

Accordingly, watering may be performed using stored water at an lower portion of the air wash module 200, and humidification may be performed using water provided by watering at a central portion of the air wash module 200. Also, a rain view may be created and humidified air may be washed at an upper portion of the air wash module 200, using a portion of water provided by watering.

That is, the humidification components may be disposed over the watering components, and the rain view components may be disposed over the humidification components. Also, the upper water supply component may be disposed over the rain view components. Thus, the respective functions of the air wash module 200 can be efficiently performed.

Through the sequential arrangement or stacked structure of the watering-humidification-rain view-water supply from the upper side, the respective functions of the air wash module 200 may efficiently operate.

A humidification and air cleaning apparatus according to an exemplary embodiment of the present invention has at least one of the following effects.

First, a rain view can be created by various methods.

Second, when watering and rain view are operated, the air flow around the air wash module can be optimized, and thus the flow resistance of air can be minimized.

Third, since configurations for watering, humidification, and water supply from the upper side are sequentially stacked, the respective functions of the configurations can be organically connected and operated.

Fourth, the direction change of the connect stream can be minimized, and thus the flow resistance of air flowing into the air wash inlet can be minimized.

Fifth, the direction change of the discharge stream can be minimized, and thus the flow resistance of air discharged into the discharge flow passage can be minimized.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
    a water tank comprising a bottom wall and a side wall that extends upward from the bottom wall;
    an air wash inlet that penetrates the side wall;
    an air discharge port formed above the water tank to discharge internal air out of the water tank;
    a visual body forming at least a portion of the water tank, the visual body located higher than the air wash inlet and formed of a transparent material;
    a watering motor disposed below the bottom wall;
    a watering housing connected to the watering motor, the watering housing disposed in the water tank and rotatable, the watering housing comprising a bottom surface thereof that is opened, and a lower end thereof that is spaced apart from the bottom wall by a suction gap, the suction gap configured to suction the stored water in the water tank into the water tank during rotation of the water tank;
    a nozzle configured to spray the suctioned water toward an inner side surface of the visual body, the nozzle disposed at a side surface of the watering housing;
    an outer main stream disposed outside the side wall of the water tank, the outer main stream flowing toward the air wash inlet to guide air from a lower side to an upper side of the water tank;
    an inner main stream disposed inside the side wall of the water tank, the inner main stream flowing toward the air discharge port to guide air from the lower side to the upper side of the water tank; and
    a connect stream passing through the air wash inlet, the connect stream being in communication with the air wash inlet to guide air from the outside to the inside of the air wash inlet.

2. The humidification and air cleaning apparatus of claim 1, wherein the inner main stream is formed to cross the trajectory of sprayed water.

3. The humidification and air cleaning apparatus of claim 1, wherein the trajectory of water is formed in a horizontal direction.

4. The humidification and air cleaning apparatus of claim 1, wherein the connect stream forms an included angle of 0 to about 90 degrees with the flow direction of the outer main stream.

5. The humidification and air cleaning apparatus of claim 4, further comprising a water tank humidification medium disposed inside the water tank to cover the air wash inlet, wherein:
    the water tank humidification medium is spaced from water stored in the water tank;
    water sprayed from the watering housing collides with the visual body and then flows down to wet the water tank humidification medium; and
    the connect stream is humidified while passing the water tank humidification medium.

6. The humidification and air cleaning apparatus of claim 1, wherein the trajectory of water is located higher than the air wash inlet.

7. The humidification and air cleaning apparatus of claim 1, wherein the nozzle of the watering housing is disposed within a height of the visual body.

8. The humidification and air cleaning apparatus of claim 1, wherein the discharge port is disposed over the air wash inlet.

9. The humidification and air cleaning apparatus of claim 1, wherein the inner and outer main streams flow along the inner side surface of the visual body.

10. The humidification and air cleaning apparatus of claim 1, wherein when the watering housing rotates, water sprayed from the watering housing forms a spray line on the inner side surface of the visual body.

11. The humidification and air cleaning apparatus of claim 1, wherein the trajectory of water sprayed from the watering housing is formed to direct from the inside to the outside of the water tank, and the flow direction of air passing the air wash inlet is formed to direct from the outside to the inside of the water tank.

12. The humidification and air cleaning apparatus of claim 1, further comprising a top cover assembly disposed over the water tank,
    wherein the top cover assembly comprises:
    a water supply flow passage to provide water to the water tank; and
    a discharge flow passage to discharge air flowing along the inner and outer main streams,
    wherein the flow direction of water supplied through the water supply flow passage is opposite to the flow direction of the inner and outer main streams.

13. The humidification and air cleaning apparatus of claim 12, wherein:
    water supplied through the water supply flow passage drops on the watering housing;

when the watering housing rotates, the dropping water forms a certain trajectory and collides with the inner side surface of the visual body; and the inner and outer main streams pass the trajectory of the dropping water to the discharge port.

14. The humidification and air cleaning apparatus of claim 13, wherein the trajectory of dropping water is located higher than the trajectory of sprayed water.

15. The humidification and air cleaning apparatus of claim 13, further comprising a watering blade disposed at an outer side of the watering housing, wherein when the watering housing rotates, at least one of the sprayed water and the dropping water collides with the watering blade to be scattered.

16. The humidification and air cleaning apparatus of claim 15, wherein the scattering water forms a trajectory that crosses the inner main stream.

17. The humidification and air cleaning apparatus of claim 1, further comprising a water tank humidification medium disposed inside the water tank to cover the air wash inlet, wherein the water tank humidification medium is spaced from water stored in the water tank, and water sprayed from the watering housing collides with the visual body and then flows down to wet the water tank humidification medium.

\* \* \* \* \*